(12) United States Patent
Yang

(10) Patent No.: US 10,848,320 B2
(45) Date of Patent: Nov. 24, 2020

(54) DEVICE-ASSISTED VERIFICATION

(71) Applicant: Apple Inc., Cupertino, CA (US)

(72) Inventor: Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 15/469,387

(22) Filed: Mar. 24, 2017

(65) Prior Publication Data

US 2017/0279619 A1 Sep. 28, 2017

Related U.S. Application Data

(60) Provisional application No. 62/313,660, filed on Mar. 25, 2016.

(51) Int. Cl.
*H04L 9/00* (2006.01)
*H04L 9/32* (2006.01)
*H04L 29/06* (2006.01)

(52) U.S. Cl.
CPC ............ *H04L 9/3268* (2013.01); *H04L 9/006* (2013.01); *H04L 9/3234* (2013.01); *H04L 9/3236* (2013.01); *H04L 63/108* (2013.01); *H04L 2209/80* (2013.01)

(58) Field of Classification Search
CPC ..... H04L 9/006; H04L 9/3268; H04L 9/3234; H04L 9/3236; H04L 2209/80; H04L 63/108

See application file for complete search history.

(56) References Cited

U.S. PATENT DOCUMENTS

2001/0032310 A1* 10/2001 Corella .................. H04L 9/006
                                                    713/156
2005/0021969 A1*  1/2005 Williams .............. H04L 9/3268
                                                    713/176

(Continued)

FOREIGN PATENT DOCUMENTS

EP          3402235 A1 * 11/2018  ........... H04L 63/205

OTHER PUBLICATIONS

Cooper et al.; Network Working Group, Request for Comments: 5280, Internet X.509 Public Key Infrastructure Certificate and Certificate Revocation List (CRL) Profile, May 2008, 151 pages.

(Continued)

*Primary Examiner* — Daniel B Potratz
*Assistant Examiner* — D'Arcy Winston Straub
(74) *Attorney, Agent, or Firm* — Dickinson Wright RLLP

(57) ABSTRACT

A device assists an embedded Universal Integrated Circuit Card (eUICC) resident in the device with verification of public key information or of security materials. The verification provided by the device can be configured by the user and/or by the eUICC. The verification includes checking for expiration of public key information or presence of an associated public key in a trusted list. The trusted list in some instances includes pinning hash values. The device can warn an end user and/or an infrastructure entity, of an issue if the verification fails. An extension of certificate revocation lists includes a logical indication of at least one new public key in a CRL list. A CRL data field may also indicate a previous CRL, where the previous CRL is the most recent CRL containing a public key listing with at least one new entry.

20 Claims, 12 Drawing Sheets

(56) References Cited

U.S. PATENT DOCUMENTS

| | | | |
|---|---|---|---|
| 2008/0034204 A1* | 2/2008 | Lakshminarayanan | ...................... H04L 9/3268 713/158 |
| 2012/0233458 A1* | 9/2012 | Sugano | ................. H04L 9/3268 713/158 |
| 2013/0227646 A1 | 8/2013 | Haggerty et al. | |
| 2017/0054708 A1* | 2/2017 | Zaw | .................... H04L 63/0442 |
| 2018/0027405 A1* | 1/2018 | Holtmanns | ....... H04W 12/0403 455/558 |

OTHER PUBLICATIONS

Eastlake; Internet Engineering Task Force (IETF), Request for Comments: 6066, "Transport Layer Security (TLS) Extensions: Extension Definitions", Jan. 2011, 25 pages.

Evans et al.; Internet Engineering Task Force (IETF), Request for Comments: 7469, "Public Key Pinning Extension for HTTP", Apr. 2015, 28 pages.

GSM Association, Official Document SGP.21—RSP Architecture, "RSP Architecture", Version 1.0, Dec. 23, 2015, 52 pages.

GSM Association, Official Document SGP22—RSP Technical Specification, "RSP Technical Specification", Version 1.0, Jan. 2016, 114 pages.

\* cited by examiner

| Identity 512 | Current Sequence 514 | Publication Time 516 | Expiry Time 518 | New Entry 520 | Last Sequence 522 | List 524 |
|---|---|---|---|---|---|---|
| 511 | 513 | 515 | 517 | 519 | 521 | 523 |

| Root CA 140 | 1 | $tp_1$ | $f(tp_1)$ | Not new. | NN | LL |
|---|---|---|---|---|---|---|
| 511 | 513 | 515 | 517 | 519 | 521 | 523 |

CRL 610

FIG. 6B

| Root CA 140 | 2 | $tp_2$ | $f(tp_2)$ | New. | NN | List 2. |
|---|---|---|---|---|---|---|
| 511 | 513 | 515 | 517 | 519 | 521 | 523 |

CRL 620

FIG. 6C

| Root CA 140 | 3 | $tp_3$ | $f(tp_3)$ | New. | 2 | List 3. |
|---|---|---|---|---|---|---|
| 511 | 513 | 515 | 517 | 519 | 521 | 523 |

CRL 630

FIG. 6D

| Root CA 140 | 4 | $tp_4$ | $f(tp_4)$ | Not new. | 3 | List 3. |
|---|---|---|---|---|---|---|
| 511 | 513 | 515 | 517 | 519 | 521 | 523 |

CRL 640

FIG. 6E

| Root CA 140 | 5 | $tp_5$ | $f(tp_5)$ | New. | 3 | List 4. |
|---|---|---|---|---|---|---|
| 511 | 513 | 515 | 517 | 519 | 521 | 523 |

CRL 650

FIG. 6F

| Root CA 140 | 6 | $tp_6$ | $f(tp_6)$ | Not new. | 5 | List 4. |
|---|---|---|---|---|---|---|
| 511 | 513 | 515 | 517 | 519 | 521 | 523 |

CRL 660

FIG. 6G

DEVICE-ASSISTED VERIFICATION

RELATED APPLICATION

This application claims benefit of U.S. Provisional Patent Application No. 62/313,660, entitled "DEVICE-ASSISTED VERIFICATION," filed on Mar. 25, 2016, which is hereby incorporated by reference herein.

FIELD

The described embodiments relate to a device assisting an embedded Universal Integrated Circuit Card (eUICC) with verification of public-key information for security purposes in a public key infrastructure (PKI) environment.

BACKGROUND

Communications of an eUICC may be authenticated using PKI techniques. An eUICC is in a class of devices or components known as secure elements (SEs). The expressions eUICC and SE are used interchangeably herein throughout. Certificates used for authentication and confidentiality purposes can be generated by a trusted certificate issuer (CI or root CA). A public-key certificate may also be referred to herein simply as a certificate.

A user may store a copy of a certificate, where the certificate holds the name of a given party (user identity). The public key recorded in the certificate can be used to check the signature on a message signed using a PKI private key of the given party. A user or message recipient may use an on-line protocol such as on-line certificate status protocol (OCSP) to determine if a certificate is valid.

A digital signature is authentication data that binds the identity of the signer to a data part of a signed message. A certification authority (CA) is a trusted third party whose signature on a certificate vouches for the authenticity of the public key of the associated user identity. If the private key of the identified user becomes compromised, all holders of the certificate need to be notified. Notification can be done, for example, with a certificate revocation list (CRL). Recipients of the CRL no longer trust messages signed with the revoked public key of the identified user.

Also, a public-key certificate may expire at a certain point in time. So, separate from the compromise issue, there is a need to improve recognition of expired certificates. Generally, time-variant parameters can be used in identification protocols to counteract replay attacks and to provide timeliness guarantees. More information on PKI can be found in the treatise A. Menezes, P. van Oorschot, and S. Vanstone, *Handbook of Applied Cryptography*, CRC Press, 1997.

A eUICC can host profiles. A profile is a combination of operator data and applications provisioned on an eUICC in a device for the purposes of providing services by an operator. A profile can contain one or more secure data used to prove identity. An eSIM is an electronic subscriber identity module and is an example of a profile.

An eUICC includes an operating system, and the operating system can include the ability to provide authentication algorithms to network access applications associated with a given operator. The operating system also can include the ability to translate profile package data into an installed profile using a specific internal format of the eUICC. An ECASD provides secure storage of credentials required to support the security domains on eUICC. A controlling authority security domain (CASD) may also be referred to as a "key store" herein.

Some activities related to an eUICC resident in a device may be performed by the device. Examples of such activities are profile download assistance and local user interface functions. More information on profile download assistance and local user interface functions can be found in "RSP Architecture," Version 1.0, Dec. 23, 2015, Official Document SGP.21, published by the GSM Association.

SUMMARY

Representative embodiments set forth herein disclose various systems and techniques for a device to assist an eUICC by performing some certificate and CRL verification checks to improve security in PKI environments. In some embodiments, verification checks offload communication and computational processing from the eUICC to the device.

An eUICC housed in a device trusts the device as a transport pathway. For example, this includes trusting the device to deliver to the eUICC, for example, an SMS message from a server requesting establishment of a hypertext transport protocol, secure (HTTPS) connection between the server and the eUICC. In exemplary embodiments set forth herein, the eUICC trusts the device to perform timestamp checking on certificates and CRLs directed to the eUICC via the device. CRL contents (and OCSP messages) are informative about whether, for example, eSIM servers are trusted or no longer trusted. The device also maintains a CRL and can check an identity on a certificate arriving for the eUICC. If the identity on the certificate is listed on the CRL, the device can discard the certificate without forwarding it to the eUICC, in some embodiments.

The timestamp checking can include checking timestamps on arriving messages such as certificates, OCSP stapled response messages and CRLs. The device can also perform a check to determine if an arriving message satisfies a pinning policy. If the arriving message is satisfactory in a timestamp and/or pinning respect, the device may forward the arriving message to the eUICC, in some embodiments.

In some embodiments, CRLs with extension information enable a device to perform error checking on a sequence of CRLs arriving at the device from a delivery server. An extension information portion, in some embodiments, is carried in a data part of the CRL data structure along with the list of revoked certificates. The extension information portion thus is signed over, along with the other data part information, by the CA signing operation that creates the digital signature, which is the signature part of the CRL. The extension information portion can include: i) a logical field that indicates if a new list is included in the CRL, ii) a sequence number or timestamp only applicable to this CRL, and/or iii) a field containing a value of a sequence number or timestamp of a most recent, or last, CRL that included a new list.

The device determines CRL delivery reliability, in some embodiments, by observing a sequence of received CRLs and performing error-checking on the corresponding sequence of extension information portions. If the device, based on history or configuration, expects periodic CRLs to be issued from a given CA, then the device can detect a missing CRL by a gap in the timestamp or sequence number information provided by the sequence of extension information portions. The device, in some embodiments, then deems delivery of CRLs from the delivery server as unreliable. The device may accept gaps in the sequence number or timestamp information and, in some embodiments, focus on the field containing an indication of a most recent, or a last, CRL with a new list. For example, if the device reads the field containing an indication of a most, or a last, CRL with a new list, and recognizes that the indicated CRL was not received at the device, the device can deem the delivery of CRLs from the delivery server as unreliable.

When the device deems delivery of CRLs from the delivery server as unreliable, the device can report this to an end user via a device user interface. Alternatively, or in addition, the device can send a message to a central entity such as a CA, root CA, or CI, informing the central entity that delivery of CRLs from the particular delivery server is unreliable.

In some embodiments, when the delivery of CRLs from the delivery server is deemed reliable, those CRLs in which the logical field indicating the presence of a new list in the CRL are forwarded to the eUICC. Also, the device can maintain a state reflecting a time information value in the eUICC. If the device determines that the time information value in the eUICC is becoming stale, old, or out-of-date, the device can forward a CRL to the eUICC although the logical field indicating the presence of a new list is not asserted. In this way, the eUICC will authenticate the CRL and obtain new time information.

The device and the eUICC may both practice certificate pinning. For example, a trusted list can hold identities of trusted servers. In a row of a trusted list or pinning table corresponding to a given server, a hash value indicates the result of performing a hash over the corresponding certificate or public key of the given server. When a certificate arrives containing the identity of the given server, a new hash can be computed on the arriving certificate and compared with the hash value from the trusted list or pinning table. If the hash values do not match, the device can take a corrective action. For example, the device can request a new certificate from the given server.

Because servers may rotate (e.g., replace with a new version) their certificates (and thus public-keys) frequently, the hash values in the trusted list or pinning table in the eUICC will become out of date unless the new certificates are obtained sufficiently often. The device, in some embodiments, requests or pulls certificates from CAs to provide these to the eUICC so that the eUICC can update the pinning policy. Pinning policy refers to one or more hash values stored in the trusted list or in the pinning table. For example, updating the pinning policy can include the device computing a hash value and storing the hash value along with a server identifier and a certificate identifier in a trusted list or pinning table in the eUICC. Because of frequent rotation of certificates, more than one certificate from a given server is valid during a certificate transition period, in some embodiments.

In some embodiments, after the device has processed received public key information such as a certificate or CRL and determined and provided a warning if appropriate, the public key information is forwarded to the eUICC (resident within the device) and authenticated by the eUICC. The eUICC then, in some embodiments, stores time information parsed from the public key information in a time information variable in the eUICC when the authentication is successful. The eUICC then, in some embodiments, checks for expiration of certificates or CRLs (that is, public key information) in eUICC memory, such as a memory holding a key store.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 6A reproduces FIG. 5B for reference.

FIGS. 6B-6G illustrate an exemplary CRL sequence and content of the data part of selected parts of the CRLs, according to some embodiments.

DETAILED DESCRIPTION

Figure 1A:
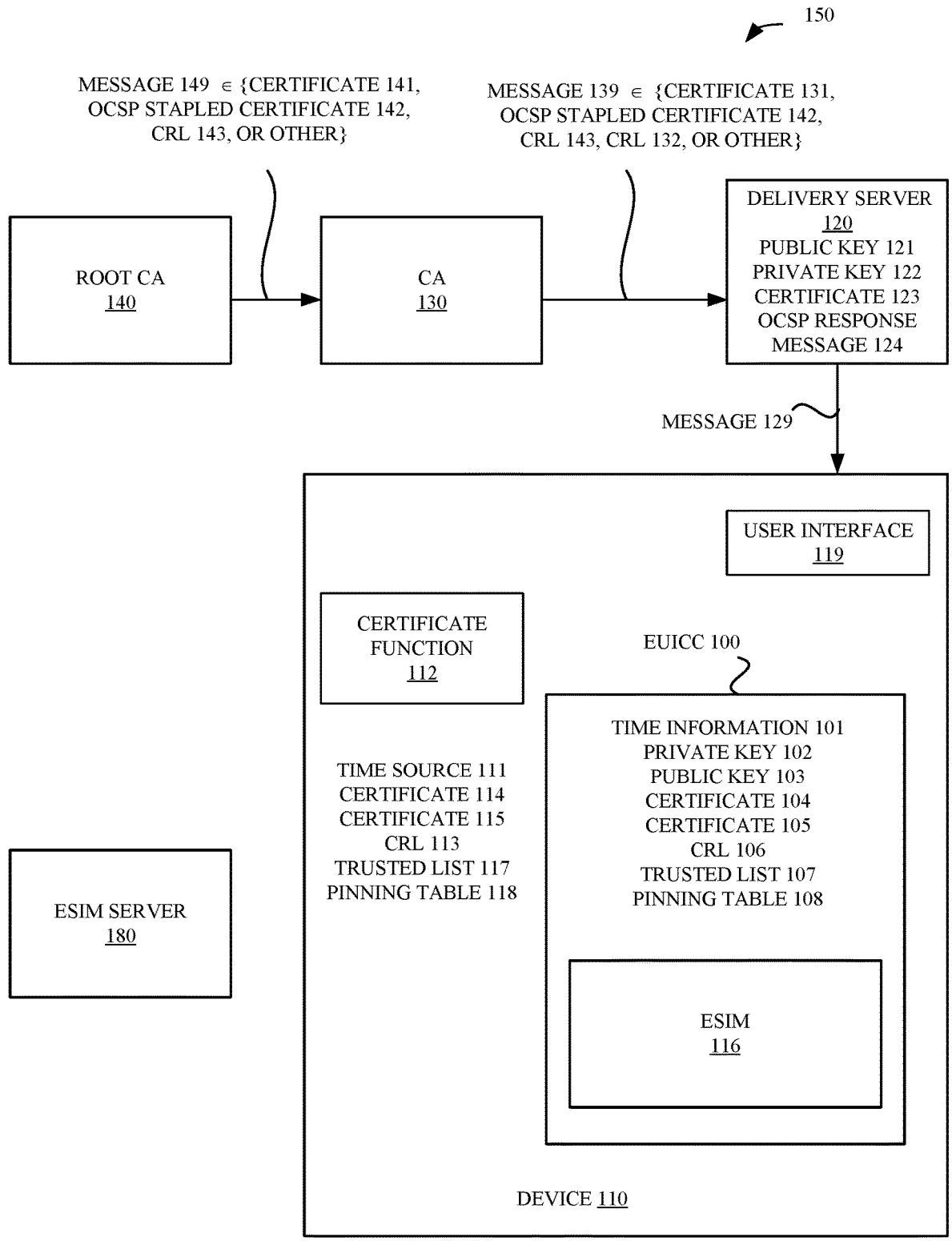
FIGS. 1A and 1B illustrate an exemplary device housing an eUICC in systems including exemplary delivery servers, eSIM servers, and CAs, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

A wireless communication device may have adequate memory and computational capacity to perform maintenance of its stored certificates using CRLs. A wireless communication device hosting an eUICC, in some embodiments, offloads communication and processing certificate or CRL verification tasks from the eUICC to the device. An eUICC may be limited in memory, computational clock rate, and time information.

Interest is increasing in the use of securing SE communications using PKI. Some problems or challenges with using PKI by an SE are as follows: i) checking reliability of certificate delivery from a delivery server, ii) checking hash values used in certificate pinning to recognize an improper certificate, and iii) recognizing a fault condition, possibly due to a Man in the Middle (MIM) attack, causing interruption of CRL delivery.

PKI

Communications of an eUICC can be authenticated using PKI techniques. PKI relies on the infeasibility of a third party determining a private key of a public key-private key pair from the public key. The public key is communicated in a data structure called a certificate. A message encrypted with the private key can be trusted to be from the purported signing party (i.e., authenticated) if decryption of the message with the corresponding public key is successful.

Certificates

A certificate is a means by which a public key can be stored and distributed over unsecured media without danger of undetectable manipulation. In practice, X.509 certificates are commonly used. X.509 is an ANSI standard which defines a certificate data structure. A public key certificate is a data structure consisting of a data part and a signature part. The data part includes a public key and a string identifying the party associated with that public key. The data part can also include a validity time period of the public key. For example, the data part can hold a published or publication time value and an expiration or expiry time value. In addition, the data part can hold a serial number of the certificate or public key. The signature part consists of the digital signature of a certification authority over the data part.

A digital signature is authentication data which binds the identity of the signer to the data part. Signing transforms the data part and some secret information held by the signer into the signature. A CA is a trusted third party whose signature on the certificate vouches for the authenticity of the public key. Because the CA is trusted, the certificate allows transfer of the CA's trust in the identified party such that the certificate recipient can securely place their trust in the identified party. If the private key of the identified party becomes compromised, all holders of the certificate need to be notified so that they will no longer trust messages signed with the corresponding public key of the identified party. This notification can be done, for example, with a CRL or detected by a negative result from OCSP.

OCSP is an Internet Engineering Task Force (IETF) protocol specified by RFC 6960. OCSP stapling (see IETF RFC 6066) is an extension of OCSP. OCSP stapling allows the presenter of a certificate to provide a timestamped OCSP response signed by a CA to the party seeking the certificate. An eUICC or SE can use OCSP stapling as a trust verification technique in order to reduce or eliminate storage of trusted certificates (public keys) and/or CRLs. The party wishing to communicate (the certificate presenter) with the eUICC or SE may supply an OCSP stapling message to the eUICC or SE on an as-needed basis.

Compromise or Expiry of a Certificate

If a third party obtains the private key of the public key-private key pair, the security of the system is broken. This is because the third party can act as an imposter and sign messages with the private key as if the third party were the identified party associated with the public key. Harm can be limited by notifying communicating parties that the associated certificate is now revoked. Thus, there is a need to improve the security of PKI-secured communications performed by an eUICC or SE since a server trusted by the eUICC or SE may become compromised. The certificate in question, in some embodiments, is the certificate of an eSIM server.

MIM Attack

A malicious actor may attempt to interrupt or remove CRLs from a transport channel terminating at an eUICC. The eUICC may then be unaware that a given certificate has been revoked by a CA. The eUICC may then trust messages signed with a private key of a public key-private key pair of a revoked certificate. There is a need to improve recognition of unreliable certificate delivery to an eUICC.

Certificate Pinning

Pinning is a PKI technique that can reduce MIM attacks due to compromised CAs. A hash of a certificate or of a public-key is called a pinned fingerprint. A certificate requestor or user agent (UA) requests that a certificate provider or host provide a certificate chain including at least one fingerprint that matches pinned fingerprints for that host. Further description of pinning is provided in IETF RFC 7469 "Public Key Pinning Extension for HTTP."

Time

Time-variant parameters which serve to distinguish one instance of something from another are sometimes called nonces, unique numbers, or non-repeating values. A nonce is a value used no more than once for the same purpose. Random numbers include pseudorandom numbers which are unpredictable to an adversary. A sequence number can serve as a unique number identifying a message. A sequence number can be a version number for a collection of information, such as a CRL. Sequence numbers are specific to a set of entities who follow a pre-defined policy for numbering. Timestamps can be used to implement time-limited access privileges.

A user of a timestamp obtains a timestamp from a local clock and cryptographically binds it to a message. Upon receiving the timestamped message, a second party obtains the time from its own clock and subtracts the timestamp received. The message is valid if the timestamp difference is in an acceptable security window. The security of timestamp-based verification relies on use of a common time reference; this requires that the sender's clock and the recipient's clock be at least loosely synchronized.

eUICC Time Information

In some embodiments provided herein, an eUICC stores time information in order to improve checking of security materials. The time information is stored in a time information variable and the value of the time information variable at a given moment is a time information value. The actual time can be stored, for example in a numerical string "yyyymmddhhmmss" providing four decimal places for the year, "yyyy", two for the month, two for the day of the month, two for the hour of the month, two for the minute of the hour and two for the second of the minute. In some embodiments, an eUICC may record a time information value as the value of an increasing counter. One example of an increasing counter controlled centrally may be referred to as an epoch.

A root CA or other CA may refresh the time information in the eUICC periodically. The refresh period, in some embodiments, is about one day. The refresh period is a security requirement. The refresh period, in some embodiments, is shorter than an average time between server compromise or average time between certificates expiring. The refresh period is sufficiently long to avoid unnecessary communication burden for the eUICC, and, for example, the root CA. For example, on a daily basis, a CA or the root CA may push a new time information value to the eUICC, in some embodiments. The eUICC, in some embodiments, pulls a new time information value from a CA or the root CA. That is, the eUICC sends a message requesting a new time information value.

The time information value received by an eUICC is signed by a CA. By implementation, time information signed by other trusted off-card entities (off-eUICC entities) may also be acceptable based on the eUICC configuration. Time information that is not under the signature of a trusted entity is not recognized or used by an eUICC.

Epoch

A CA may increase an epoch value; this will be reflected in subsequently issued certificates. As discussed above, an epoch value may be a counter type of time information. In some embodiments, the epoch is increased when a new certificate is issued. The eUICC can verify that the epoch in a received certificate is higher than that of a current certificate, before storing the new certificate. Revoking certificates in an eUICC can be challenging due to various eUICC resource constraints; i.e., processing a large revocation list may be infeasible for an eUICC. To avoid maintaining revocation lists, some certificates can be associated with an epoch. If a CA is compromised, the root CA (which may also be referred to as a CA) creates a unique unused epoch value and reissues certificates for all legitimate entities with the new epoch value in each new certificate. At the eUICC, the eUICC saves the expected epoch of various servers in non-volatile memory. When a received certificate contains a higher epoch, the eUICC may update the corresponding epoch and reject any future certificates with a lower epoch; i.e., the eUICC will reject rogue servers distributing certificates that have not been signed since the CA was compromised.

Device Methods

A PKI environment can include one or more CAs, a delivery server, and a device. The device can include an eUICC, an operating system, a device certificate function implemented in hardware and/or software to assist in certificate verification and a user interface. The delivery server may connect to a wireless base station through the internet, and the wireless base station may connect to the device through a radio access technology, for example, a cellular or wireless local area network technology.

A root CA may sign a certificate for a CA and then send it to the CA. The CA may then sign a second certificate for a downstream CA and send both certificates to the downstream CA for distribution so that others will trust the downstream CA. In some systems, the chain of trust is simply the root CA signing a certificate for a CA and then the CA sends the signed certificate to a delivery server for delivery to an eUICC via a device. In some embodiments, the device OS or the device certificate function performs an expiration check on the certificates.

If the check is satisfactory, the certificate is forwarded to the eUICC. The eUICC carries out the authentication step of determining whether the signature part of the certificate corresponds to a signing operation by the root CA over the data part of the certificate.

If the check is not satisfactory, a warning message, in some embodiments, is sent to a device user interface. The check can be based on certificate expiration, presence of an identifier of the certificate on a CRL in the device, and/or based on certificate pinning.

In some embodiments, the delivery server delivers the second certificate to the device along with an OCSP response message. The check in that case, in some embodiments, includes a timestamp check on the OCSP response message. When the check is satisfactory and the eUICC receives the OCSP stapled second certificate, the eUICC verifies that the OCSP response message is authentic by cryptographic verification of the signature on the OCSP response message.

The delivery server, in some embodiments, directs a CRL to the eUICC via the device. The device, in some embodiments, checks for expiration of the CRL. If the CRL has expired, the device, in some embodiments, notifies or warns the end user via the user interface of the expiration, notifies the end user of the CA that signed the CRL, and asks whether the CRL should be delivered to the eUICC. If the user approves delivery to the eUICC, the eUICC then verifies the signature on the CRL.

CRL Data Part Extension

The CA can add an extension information portion, in some embodiments, in a data part of the CRL data structure along with the list of revoked certificates. The extension information portion is signed over, along with the other data part information, by the CA signing operation that creates the digital signature, which is the signature part of the CRL. The extension information portion can include: i) a logical field that indicates if a new list is included in the CRL, ii) a sequence number or timestamp only applicable to this CRL, and/or iii) a field containing a value of a sequence number or timestamp of a most recent, or a last, CRL that included a new list.

A delivery server provides CRLs from a CA to the device. The delivery server may perform an evaluation to determine whether there is a need to deliver a given CRL. The evaluation can be done by checking the logical field indicating whether a new list is included in the CRL. For example, if the time information is up-to-date in the eUICC, then a CRL that does not contain at least one new entry is not of use at the eUICC. The delivery server, in some embodiments, pushes CRLs to the eUICC. The delivery server, in some embodiments, evaluates network loading, and does not push a CRL to the eUICC if the network is heavily loaded. In some embodiments, the delivery server evaluates device power level, and does not push a CRL to the eUICC if there is a need to reduce device power consumption.

The device can monitor information about a past CRL and a present CRL to determine if the present CRL is fresh, on-time, informative to the eUICC, not suspicious or not out-of-date. For example, the device can check the extension information portions on a sequence of CRLs in order to determine whether CRL delivery from the delivery server is reliable. A sequence is an ordered series consisting of two or more items. If an arriving CRL passes the reliability check, then the device, in some embodiments, performs a further check to see if the logical field indicates that the CRL contains a new list or revoked certificates. A list is new if it contains at least one newly-listed entry not present on a previous list. In some embodiments, if the further check determines that the logical field indicating a new list is asserted, then the CRL is forwarded to the eUICC. If the device determines from the extension information portions of two or more certificates that an unpredictable, faulty, unexpected delivery, or failure of an expected CRL delivery has occurred, then the device can issue a warning. The warning can be to an end user via the device user interface. Alternatively, the warning can be to a root CA. The warning to the root CA, in some embodiments, identifies the delivery server and the certificate or certificates that triggered the warning event.

Device Assisted Certificate Pinning on an eUICC

The eUICC, in some embodiments, maintains a trusted list or pinning table of trusted servers. The trusted list, in some embodiments, is implemented using certificate pinning. Certificate pinning creates a label for a certificate using a hash. The hash can be over the certificate or over the public key carried in the data part of the certificate. The trusted list can be a table with a row or portion of the table associated with a particular server. An identifier of the server or certificate is stored in the row along with the hash value. When a certificate arrives at the eUICC identifying the server, the eUICC, in some embodiments, computes the hash value on the arriving certificate and compares it with the hash value in the table. If the hashes do not match, then the arriving certificate is suspect.

The device, in some embodiments, assists the eUICC with certificate pinning. The eUICC proactively obtains a new certificate (or a new public key) from a given server in order to keep up in time with certificate/public key rotations performed by the server. The device or eUICC can perform a hash computation on the newly obtained certificate and determine if an update to the trusted list in the eUICC should take place. In this way, the eUICC can rewrite the pinning policy in the trusted list based on the latest certificate or public key.

Certificate pinning, in some embodiments, includes maintaining a list of trusted server common names, as written in certificates. In some embodiments, a valid time for a given certificate is used to provide certificate pinning. For example, a trusted list or pinning table, in some embodiments, includes a row or data portion associated with a public key obtained from a given certificate. The row or data portion associated with the public key also includes a name of the entity taken from the given certificate. In some embodiments, the name is a server common name. The row or data portion associated with the public key obtained from the given certificate, in some embodiments, includes a time indication. The time indication, in some embodiments, is a publication time. The time indication, in some embodiments, is an expiration time.

In some embodiments described herein, an eUICC maintains a notion of time as time information, using, for example, timestamps. The eUICC, after updating the time information in the eUICC to produce updated time information, the eUICC reads through the trusted list or pinning table to detect whether a time indication in a given row or data portion is of interest with respect to the updated time information.

For example, consider a particular time indication of a given certificate represented in the trusted list or pinning table. The particular time can correspond to a publication time, and the particular time can be earlier than the updated time information, indicating that the public key of the given certificate is in force or valid until an expiration time. A second particular time of the given certificate corresponds, in some embodiments, to the expiration time. If the second particular time (the expiration time) is earlier than the updated time information, then the public key of the given certificate is in no longer in force or the given certificate has expired.

An eUICC using the trusted list or pinning table, with information that the device helped it obtain, can take appropriate action after updating the time information and checking the trusted list. For example, the eUICC can request a new certificate if a certificate has expired. Alternatively, or in addition, the eUICC can remove a public key from the trusted list or the pinning table when a certificate has expired as determined above.

The eUICC, in some embodiments, maintains both a previous and a new certificate (or public key) during a transition period when a given server is performing a certificate/public key rotation. During the transition period, there is an overlap time in which both the previous and the new certificate are valid.

Messages and Functions, Overview

FIG. 1A illustrates an exemplary system 150 for a device 110 receiving a message 129 and assisting an eUICC 100 with certificate and CRL verification. Logic for performing the assistance, in some embodiments, is in a certificate function 112. The certificate function 112 can be realized with hardware and/or software. The device 110, in some embodiments, includes a time source 111 and various information items. The information items, in some embodiments, are a certificate 114, a certificate 115, a CRL 113, a trusted list 117, and a pinning table 118. The device 110 can communicate with an end user (a human being) with a user interface 119.

In some embodiments, the device 110 is in a form factor for machine-to-machine operation and may not include the user interface 119. The device 110 can be, for example, a wireless communication device or a machine-to-machine device. An example of a wireless communication device is a cellular telephone. Example deployments of machine-to-machine devices are with gas meters or in automobiles.

The eUICC 100, in some embodiments, includes time information 101, private key 102, public key 103, certificates 104 and 105, CRL 106, trusted list 107, pinning table 108, and eSIM 116.

The message 129, in some embodiments, is sent by a delivery server 120. The delivery server 120, in some embodiments, is associated with a public key 121, a private key 122, and a certificate 123 (holding the public key 121 and an identity of the delivery server 120). Transmission of the message 129 by the delivery server 120, in some embodiments, is triggered by transmission of a message 149 by a root CA 140 and/or by the transmission of a message 139 by a CA 130.

Examples of message 139 are a certificate 131, an OCSP stapled certificate 142, a CRL 143, or a CRL 132. The certificate 131, in some embodiments, is a certificate holding a public key of CA 130 and signed by root CA 140. Examples of message 149 are a certificate 141, the OCSP stapled certificate 142, or the CRL 143. Messages 139 and 149 are not limited to these examples. Certificate 141 is signed by a trusted third party (not shown). An alternative form of providing trust is represented by the OCSP stapled certificate 142 that represents certificate 131 and an OCSP response message vouching the authenticity of certificate 131 and signed over by, for example, the root CA 140.

Device 110 is trusted by the eUICC 100 to perform some tasks. For example, the eUICC 100 trusts the device 110 to forward any SMS message addressed to the eUICC 100 from delivery server 120, CA 130, or root CA 140. The eUICC 100 does not, however, delegate authentication or decryption tasks to the device 110.

FIG. 1A also illustrates an eSIM server 180 as part of the PKI environment of the system 150.

CRL Example

Message 129, in some embodiments, comprises the certificate 123. The eUICC 100 uses the public key of the delivery server 120 to verify the authenticity of messages coming from the delivery server 120. The eUICC needs to have a fresh copy of the public key corresponding to the private key in use by the delivery server 120. Otherwise, a malicious party that has obtained the private key of the delivery server 120 (this is called compromising the server) can send a bogus message to the eUICC 100 and sign over it with the compromised private key of the delivery server 120. When the eUICC 100 checks the signature on the bogus message using the public key of the delivery server 120, the message will appear authentic. This situation is mitigated by distribution of certificate revocation lists (CRLs). For example, a server Z has been compromised (its private key discovered). Root CA 140, CA 130 of the delivery server 120 will issue a CRL, for example CRL 143, that includes an identity of the server Z and an indication of the public key of the server Z that has been compromised. The eUICC 100 will process the CRL 143, learn that a public key of the server Z has been compromised, and place the compromised public key on an untrusted list. When a message arrives signed with the compromised private key, the eUICC 100 will check authenticity using a fresh certificate (including a new public key corresponding to a new private key in use at the server Z) from the server Z. In this example, the message is bogus and signed with a no-longer-secret private key. The new public key will cause the authentication check operation to fail and the bogus message will be detected without causing harm at the eUICC 100.

Because of the possibility of server compromise, certificate rotation or public key-private key pair refresh operations at servers and CAs is a common practice. Rotation in PKI means generation of new public key-private key pairs. This means that new certificates and CRLs are issued on a somewhat frequent basis. The eUICC 100 has limited computation and memory resources in comparison with the device 110. In embodiments described herein, the device 110 assists the eUICC 100 in verifying certificates and CRLs so that some communication and processing tasks are offloaded from the eUICC 100 to the device 110 while keeping certificate and CRL information in the eUICC 100 up-to-date. The security domain of the eUICC 100 is not expanded in an authentication or encryption sense to the device 110.

Certificate Function 112, Assistance Examples

The delivery server 120, for example, sends a message 129 including i) a CRL, or ii) a certificate 123 and an OCSP response message 124, in some embodiments. The CRL, in some embodiments, is CRL 143 from the root CA 140 or CRL 132 from the CA 130. The device 110, in some embodiments, performs filtering of the message 129 using the certificate function 112. The certificate function 112 can be configured by the end user using the user interface 119 or can be configured by the eUICC 100. If the certificate function 112 is configured to filter the contents of the message 129, the certificate function 112, in some embodiments will proceed as follows: i) produce a decision value to indicate if a problem may exist, and ii) if the decision value is false, forward the message 129 or contents thereof to the eUICC 100; if the decision value is true, provide a warning about the message 129 to the end user on the user interface 119. A false value is also described herein as a negative value, and a true value is also described herein as a positive value. The production of the value, in some embodiments, is based on an expiration time of the contents of the message 129, or the results of a pinning check of the contents of the message 129.

For example, the device 110 has a time source 111. Time source 111, in some embodiments, includes time information from an MNO. This time information can be the present year, month, date, hour, minute, and second. The device 110 can use the time source 111 to compare with a timestamp on the certificate 123, the OCSP response message 124, the CRL 143, or the CRL 132. These certificates, responses, or CRLs (generally, security materials or public key information) represent a content of the message 129. If an expiration time of the PKI security material has already occurred, then the certificate function 112 will declare or produce a positive or true decision value. That is, the decision value, when true (positive) indicates that a user warning is appropriate. A user warning will then be provided to the end user via the user interface 119. The end user can, in response to any warning, override the concern of the certificate function 112 thus causing the contents of the message 129 to be forwarded to the eUICC 100. Also the end user can request that the device 110 obtain a new certificate for the server identified in the message 129, or the end user can indicate that the message 129 is to be discarded.

Alternatively or in addition to the warning to the end user via the user interface 119, the certificate function 112, in some embodiments, sends a warning to a PKI network entity in response to a positive decision. For example, in some embodiments, the device 110 sends an infrastructure warning to the root CA 140, the CA 130 or the delivery server 120. The infrastructure warning includes an identity of the entity that signed the security material (certificate, CRL or OCSP response), an identifier of the message 129 such as a sequence number, transaction identifier or timestamp, and/or an identity of the delivery server.

The certificate function 112, in some embodiments, will determine whether a certificate arriving in the message 129 is indicated on the CRL 113. If the certificate function 112 identifies a public key, server identity, or CA identity associated with the message 129 on the CRL 113, then the decision value will be true and a user warning will be provided to the end user via the user interface 119. The end user can respond as described above.

The certificate function 112, in some embodiments, is configured by the end user or by the eUICC 100 to determine whether a certificate arriving in the message 129 satisfies a certificate pinning check. The certificate function 112, in some embodiments, performs a pinning check by computing a hash value over a content of the message of message 129. The hash value, in some embodiments, is performed over the certificate 123, for example, in the message 129. Alternatively, the hash value can be performed over the public key 122 found in the certificate 123 (or the public key of another certificate arriving in the message 129). The certificate function 112 then reads a hash value from the pinning table 118.

The pinning table 118 includes rows or data portions, with each row or data portion corresponding to a server or CA. The certificate function 112 then searches for a match throughout the row or data portion corresponding to the server or CA identified with the certificate in question. For example, for certificate 123, the server identity would be that of the delivery server 120. For the certificate 131, the identified CA would be the CA 130. For the CRL 132, the identified CA would be the CA 130. For the CRL 143, the identified CA would be the root CA 140.

In some situations, the certificate function 112 finds a match. In that case, the security material (certificate, CRL) passes the certificate pinning check and the decision value is negative. In other situations, for example, a signature by a compromised server that has been previously identified on a CRL, the security material fails the certificate pinning check and the decision is positive ("issue a warning"). For a positive decision, the warning can be provided to the end user as above and/or to a CA or server as described above with respect to an infrastructure warning.

In some situations, the decision will be positive, a warning will be issued, and the contents of the message 129 will nevertheless be forwarded to the eUICC 100. For example, the certificate function 112 or the end user may determine that the warning is not critical. Or, the warning, in some situations, is related to a recent expiration, and the security material is still considered informative and trustworthy. For example, the timestamp on the security material may be more recent than the last timestamped-information forwarded to the eUICC 100.

Delivery Server 160

Figure 1B:
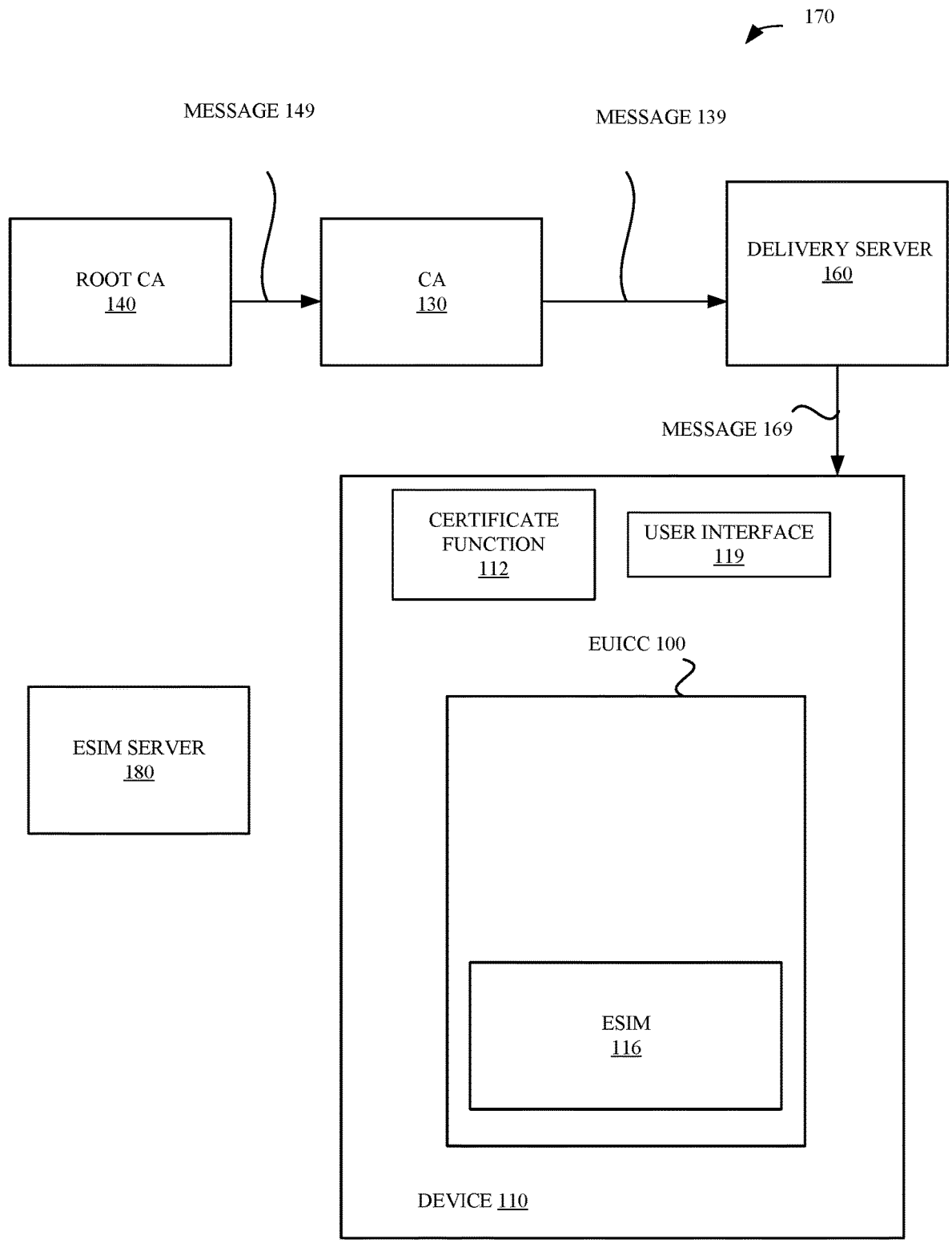

FIG. 1B illustrates an exemplary system 170 with delivery server 160 and message 169. The job of the delivery server 160 is to deliver a list of eSIM provisioning/management servers. For example, eSIM server 180 is, in some embodiments, an eSIM provisioning/management server. A CRL from the delivery server 160, in some embodiments, includes a list of eSIM provisioning/management servers that are no longer trusted, for example, the public keys eSIM provisioning/management servers indicated in the CRL are revoked. The delivery server 160 is untrusted. The discussion of methods and actors above with respect to FIG. 1A is also applicable with FIG. 1B with message 169 taking the place of message 129, with the difference that delivery server 160 is untrusted. Thus, the device 110 and the eUICC 100 do not place an identity of the delivery server 160 in a trusted list, or in a pinning table. Security materials, in some embodiments, are stored, flow through, and/or are obtained by the delivery server 160. The delivery server 160 does not sign messages with a private key of a public key-private key pair. Delivery servers 120 and 160, in some embodiments, are both present in a system with root CAs, CAs, and devices housing eUICCs.

Exemplary Network System

Figure 2:
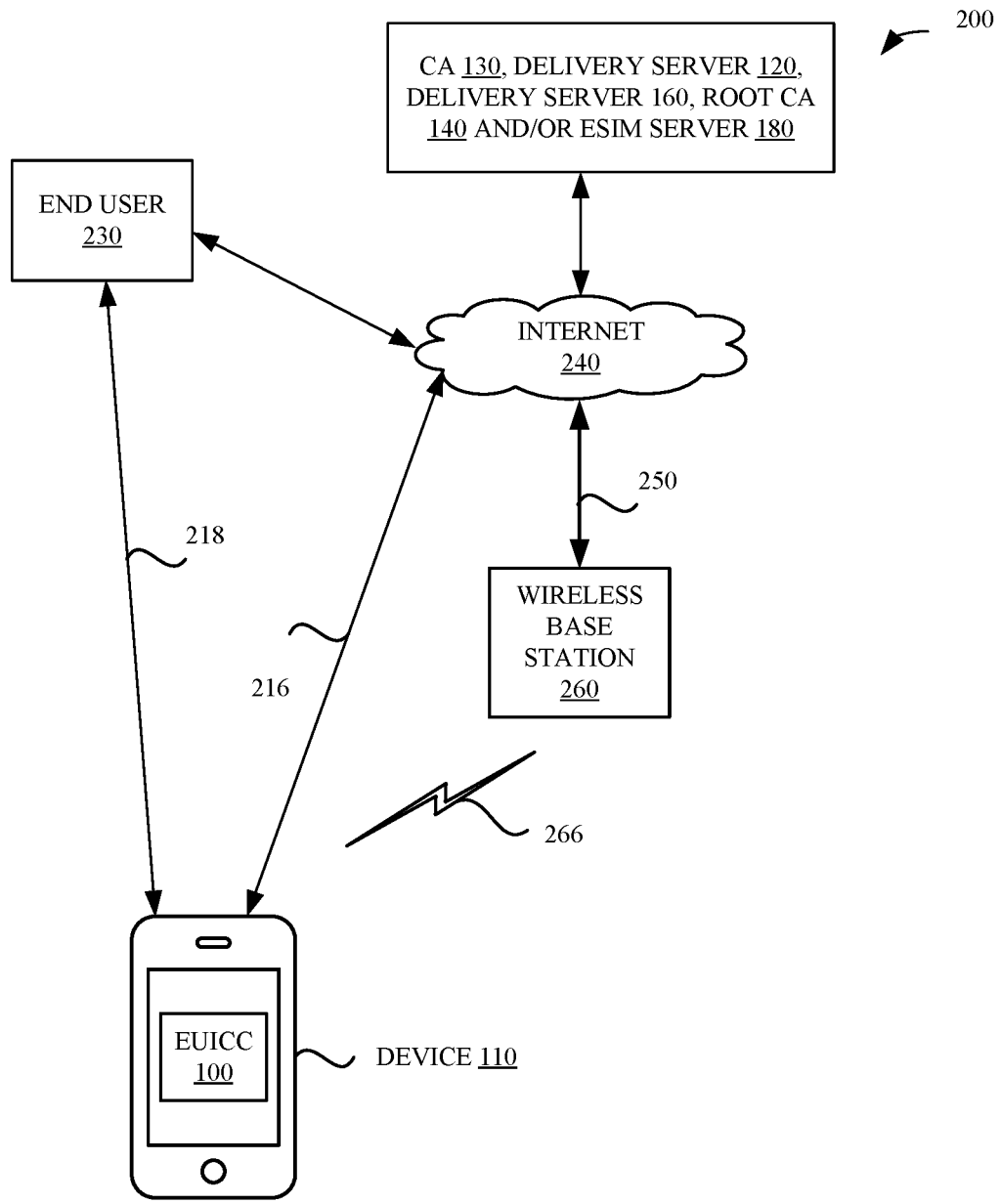
FIG. 2 illustrates an exemplary device in communication with an end user. The device also communicates with a CA, delivery server, and/or root CA via the Internet and possibly via a wireless base station, according to some embodiments.

FIG. 2 illustrates an exemplary network system 200. The eUICC 100 in the device 110 can be in communication with i) an end user 230 through interface or connection 218, with ii) the Internet 240 through a wired connection 216, and with iii) a wireless base station 260 through a radio connection 266. Wireless base station 260 is able to communicate through the Internet 240 as shown by connection 250. The CA 130, the delivery server 120, the delivery server 160, and/or the root CA 140, for example, can communicate with the eUICC 100 through the Internet 240.

Device-Assisted Verification, Exemplary Logic

Figure 3:
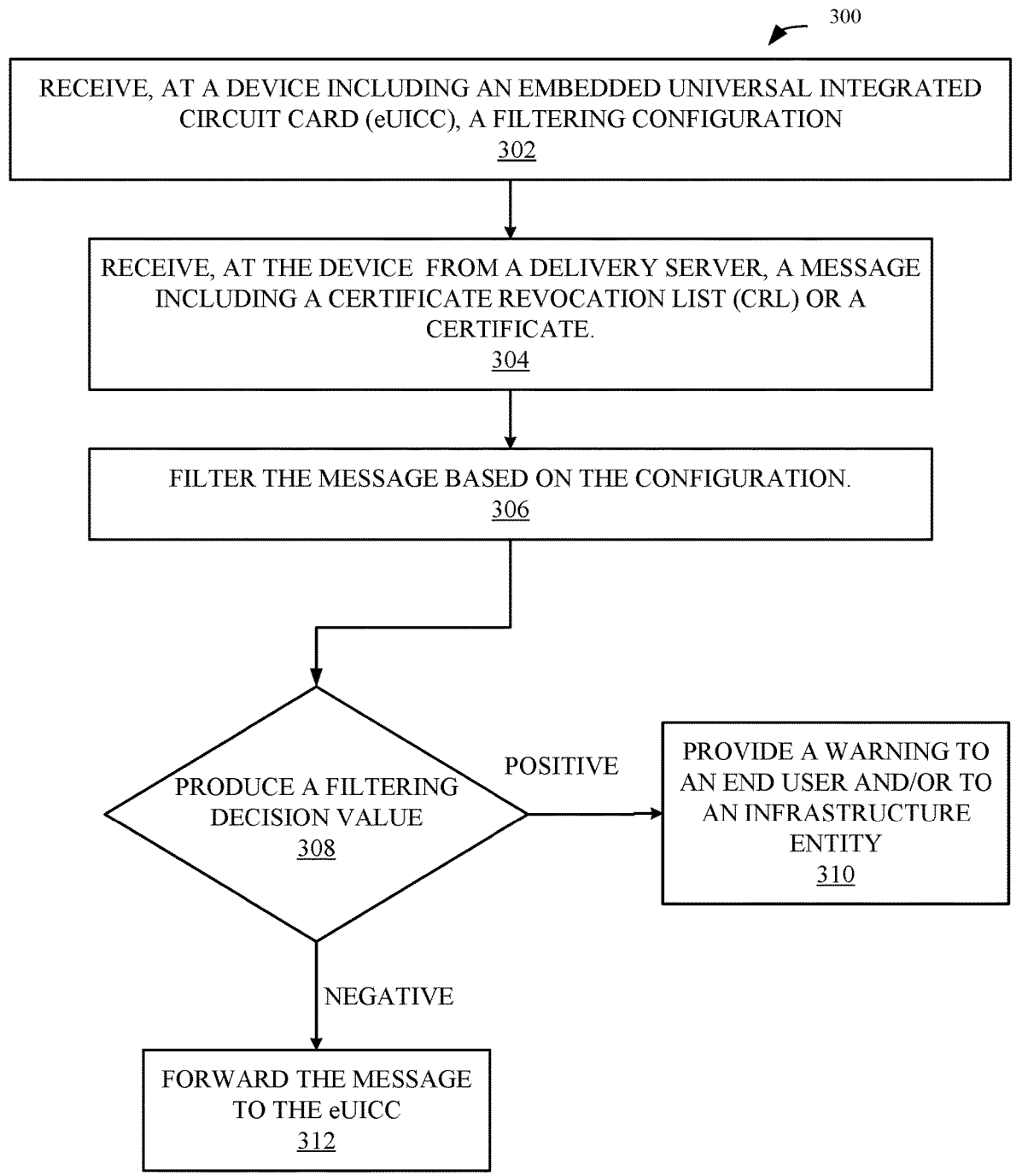
FIG. 3 illustrates exemplary logic for a device assisting an eUICC with verification of public key information, according to some embodiments.

FIG. 3 illustrates exemplary logic 300 for a device providing verification assistance to an eUICC. At 302, a device receives a filtering configuration. At 304, the device receives, from a delivery server, a message including security materials such as a certificate or a CRL. The certificate can be an OCSP-stapled certificate. For example, in some embodiments, the OCSP-stapled certificate is a certificate of the eSIM server 180 and the OCSP response of the stapled certificate vouches for or verifies the trustworthiness of the eSIM server 180 at the time the OCSP response was generated. The certificate may arrive at the device along with an OCSP response message provided by a server vouching for the authenticity of the certificate. At 306, the device filters the message based on the configuration and produces a decision at 308. When the filtering decision is positive, a warning is provided at 310 to an end user (a human being) and/or to an infrastructure entity. The warning signifies that the device detected something wrong or unexpected about the message or the message contents. When the filtering decision is negative, the device, at 312, forwards the message or message content to the eUICC. A third filtering outcome is possible (not shown). That is, in some embodiments, the filtering decision is not binary. The third filtering decision can be that there is nothing wrong or unexpected about the message but that the eUICC does not need the message and so there is no warning and there is no forwarding. A rule for deciding that a message, although proper, is not needed at the eUICC can be provided to the device from the eUICC by a policy message or policy primitive sent from the eUICC to the device at the time the device is configured. The device can be configured by the eUICC, for example, at a power-on condition when an end user turns the device on.

Device-Assisted Verification, Message Flow

Figure 4:
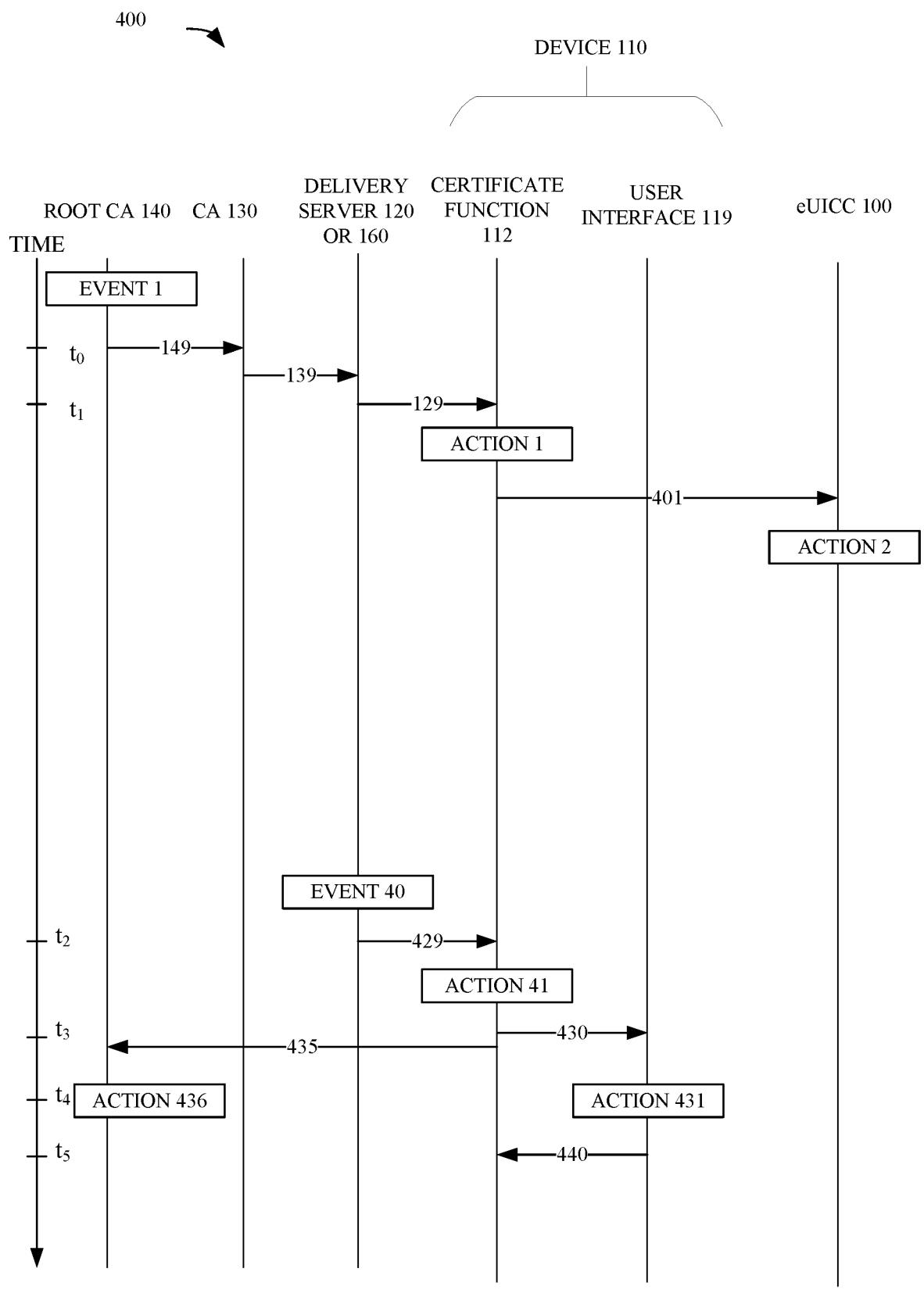
FIG. 4 illustrates exemplary message flows between a root CA, CA, delivery server, a device and an eUICC, according to some embodiments.

FIG. 4 illustrates a diagram 400 of exemplary message flows related to device-assisted verification. A time axis is shown on the left hand side, with time advancing from top to bottom; selected moments in time are marked on the time axis. The top of the figure is labelled with entities, actors, or components found in FIG. 1, each associated with a vertical bar representing events in time at that entity, actor or component.

At some point in time, root CA 140 determines, for example and shown as Event 1, that a new CRL should be distributed (a CRL-update decision can also be made by the CA 130). The root CA 140 sends the new CRL via the message 149 to the CA 130 at a time $t_0$. The message 149 is signified by an arrow labelled 149 passing from the root CA 140 vertical bar to the CA 130 vertical bar. This format is used throughout the figure. The CA 130 forwards, with or without reformatting, the new CRL in the message 139 to the delivery server 120 or 160. The delivery server 120 or 160 determines that the new CRL should be sent to the eUICC 100 and sends the new CRL to the device 110 in the message 129 at a time $t_1$. The device 110 invokes the certificate function 112 to perform filtering based on device configuration. The certificate function 112 performs filtering indicated as Action 1. In the example illustrated, the filtering activity returns a negative result and the new CRL is forwarded to the eUICC 100 in a message 401 to the eUICC 100 physically within the device 110. The eUICC 100 then processes the new CRL in a conventional manner as indicated by Action 2.

As a second example, in FIG. 4 the delivery server 120 becomes compromised (Event 40). The delivery server 120 sends a message 429 (which is bogus) to the eUICC 100 at a time $t_2$ including a certificate 123. The certificate function 112, in some embodiments, checks the contents of the message 429. For example, in some embodiments, the certificate function 112 checks an expiration of the certificate 123, checks to see if the public key 121 associated with the certificate 123 is on the CRL 113, and/or checks to see if a hash of the certificate 123 matches with the delivery server 120 row or data portion in the pinning table 118. In this example, the certificate has expired (that is, the time $t_2$ is later than the expiration time value found in the certificate 123), the public key 121 is on CRL 113, and/or the certificate fails the certificate-pinning check. That is, the decision value from the filtering operation of Action 41 is positive. The device 110 then sends a warning 430 to the user interface and/or a warning 435 to the root CA 140 at about time $t_3$. At a time $t_4$, the root CA 140 then performs Action 436 and/or the end user reads the warning at Action 431. The end user, in some embodiments, responds by selecting an action for the device 110 to take and informs the device accordingly with message 440 at a time $t_5$.

Device-Assisted CRL Update

Figure 5A:
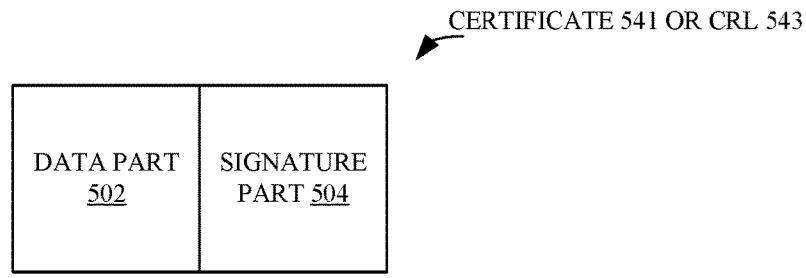
FIGS. 5A and 5B illustrate exemplary formats of certificates and CRLs, according to some embodiments.
Figure 5B:
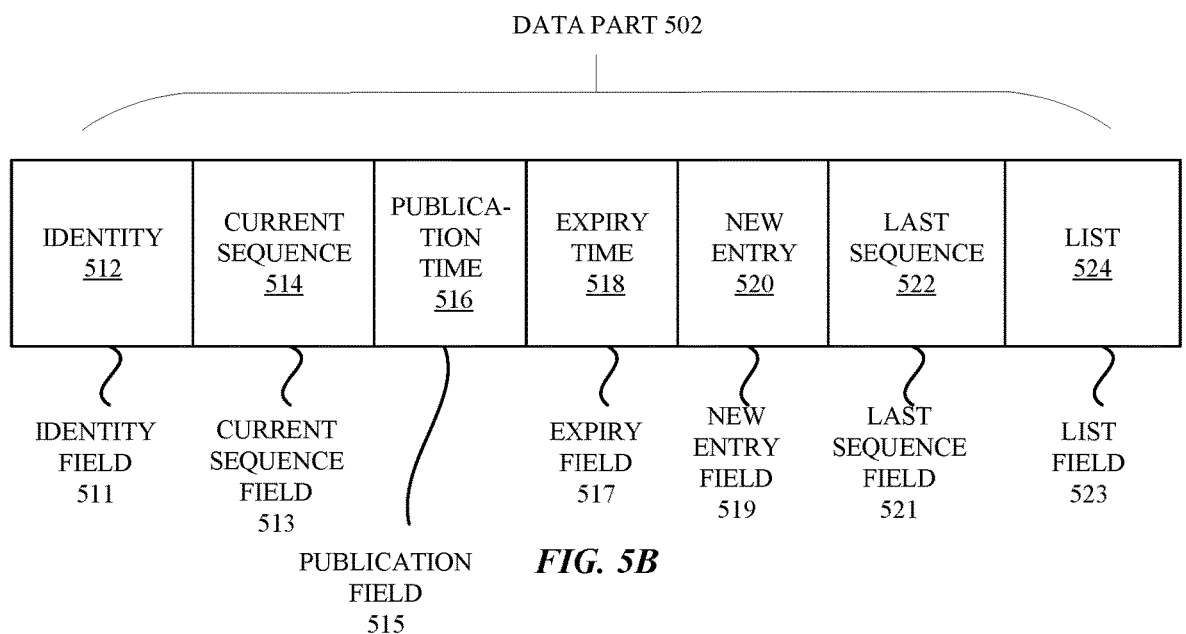

FIG. 5A illustrates a format of an example security material item. For example, the item provides an exemplary format of a certificate 541 or of a CRL 543 (or of any of the other certificates or CRLs described herein). As an example, each of certificate 541 and the CRL 543 include a data part 502 and a signature part 504. FIG. 5B illustrates data part 502 for CRL 543. Data part 502 includes several data fields. Fields in addition to those shown here exist in certificates and CRLs, generally.

FIG. 5B illustrates identity field 511 with identity value 512, current sequence field 513 with current sequence value 514, publication field 515 with publication time value 516, expiry field 517 with expiry time 518, new entry field 519 and new entry value 520, last sequence field 521, and last sequence value 522, and list field 523 with list 524. FIG. 5B is discussed with respect to CRL 543 as an example. The same format, in some embodiments, is used for CRLs created by CAs and CIs other than root CA 140. For example, the identity field 511 can contain an identity value 512 identifying root CA 140, CA 130 or another root CA or CA.

FIG. 5B illustrates an extension of past CRL formats. The extension includes the new entry field 519 and/or the last sequence field 521. The new entry value 520 informs a recipient of CRL 543 as to whether or not the list 524 in CRL 543 includes a new entry not before listed in a CRL sent by the sender with identity 512. If the new entry value 520 is "true," "asserted," or "new" it means that a new entry is present in list 524. Entries of "false," "not asserted," or "not new" mean that the entirety of the list 524 has already been published in some CRL with an earlier current sequence number 514 and/or an earlier publication time 516. The last sequence field 521 holds a last sequence value 522 that indicates the sequence number of the last CRL before this one in which the new entry value 520 was "new."

FIGS. 6B-6G provide an example chronological sequence of CRLs from root CA 140. FIG. 6A is a reproduction of FIG. 5B provided for reference. Only fields of interest in the data parts 502 are shown.

All of the CRLs 610, 620, 630, 640, 650, and 660 are published by root CA 140 as indicated by the value in the identity field 511 in each. In this example, sequence numbers in the field 513 advance by one for each new CRL published. Publication values $tp_1$, $tp_6$, occur in the publication time field 515 for the sequential CRLs. The expiration time values shown in the expiry field 517 are all shown as a function of the publication time. That is, the expiration time may occur a fixed period of time after the publication time.

If device 110 or eUICC 100 receives a CRL of this format from a CA other than root CA 140, that CRL may be retained and processed, but that CRL would not be processed in terms of the fields 519 and 521 as set by root CA 140. The information in observing a sequence of CRLs applies to CRLs published by the same CA, because the format of FIG. 5B makes use of the state at the publishing CA. Another CA would, in general, not know what that state is.

In this example, data part 610 in FIG. 6B has a field 517 with value $f(tp_1)$. For example, if $tp_1$ indicates the date Jan. 1, 2016, and the expiration time is 1 month later, then $f(tp_1)$ indicates Feb. 1, 2016. New entry field 519 is populated with a value that indicates whether the CRL contains a list in list field 523 that identifies a CA, server, certificate, and/or public key that is revoked. Field 519 of data part 610 indicates the value "Not new" (this could be coded, for example, as the bit value 0). Last sequence field 521 in data part 610 is marked as NN to simply represent some value. That is, in this example, NN in this field simply represents some sequence number of a most recent CRL published before the time $tp_1$, where that CRL included a new list. Field 523 of data part 610 is marked as LL to indicate the most recent, or last, list with a new entry.

CRL 620 in FIG. 6C illustrates a CRL including a List 2 occupying field 523. List 2 has not been published before, that is, some entry on List 2 has not been published before. List 2 is not identical to List LL. The newness of List 2 is flagged or indicated by the assertion of the logical value in field 519. That is new entry field 519 has a new entry value 520 with a value of "New" (this could be coded as the bit value 1). Note that the sequence number of CRL 620, indicated in current sequence field 513 with the current sequence value 514 of 2.

CRL 630 in FIG. 6D illustrates the behavior of list sequence field 521. Because CRL 620 included a list with a new entry, CRL 630 points to CRL 620 by providing the sequence number of CRL 620 in the last sequence field 521. Last sequence field 521 of CRL 630 thus holds the last sequence value 522 equal to 2. Unrelated to field 521, field 519 of CRL 630 holds the asserted value "New" and field 523 holds a not-before-published list 524, that is, List 3.

CRL 640 in FIG. 6E illustrates a CRL that follows a CRL with a new list, while CRL 640 has no added entry to that list. Thus, comparing CRL 640 and CRL 630 List 3 appears again in field 523, the new entry field 519 has a value of "Not new" and the last sequence field points to the sequence number of CRL 630, that is, 3.

CRL 650 in FIG. 6F illustrates a new list, in particular List 4. Field 521 points to the sequence number at the publication time of the last new list, in particular list 3 published in CRL 630, which had current sequence value 514 of 3.

CRL 660 in FIG. 6G illustrates repetition of an old list, in particular List 4. Field 521 points to the sequence number at the publication time of the last new list, in particular List 4 published in CRL 650, which had current sequence value 514 of 5.

Example Message Flows, CRL Sequence

Figure 7:
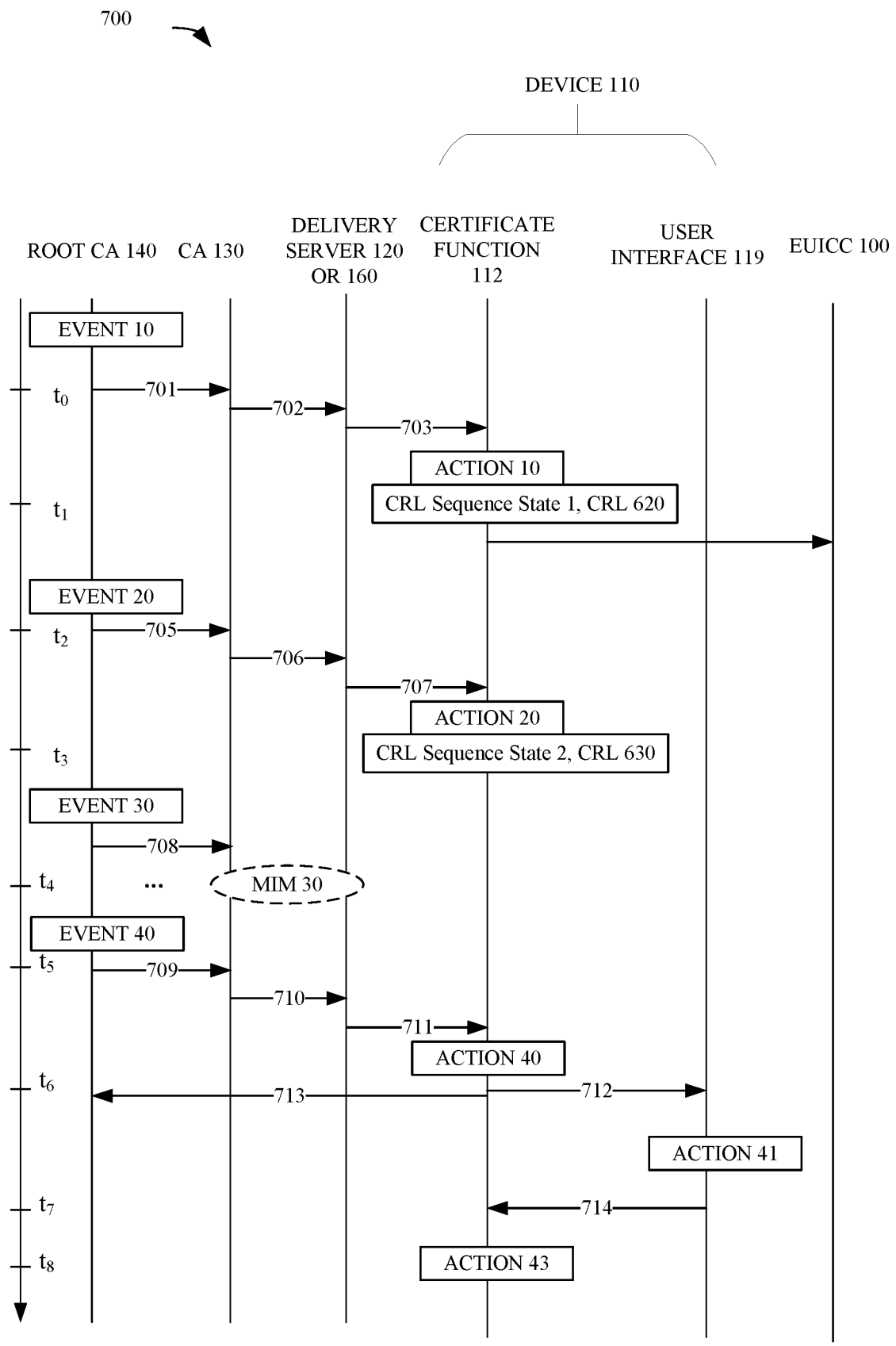
FIG. 7 illustrates exemplary message flows discussing selected CRLs from FIGS. 6B-6G, according to some embodiments.

FIG. 7 illustrates a diagram 700 of processing of selected CRLs illustrated in FIGS. 6B-6G. FIG. 7 has a time axis on the left and entity names across the top, similar to FIG. 4. Event 10 at root CA 140 causes root CA 140 to send a CRL in a message 701. A CRL-triggering event, in some embodiments, is the arrival in time of a CRL update time milestone, for example, if root CA 140 periodically publishes CRLs whether or not a list 524 has been changed. In some embodiments, a CRL-triggering event corresponds to a determination that a public key has become comprised, and the various entities in the PKI infrastructure need to be informed that reliance on the public key can lead to a security breach.

In the illustrative example of FIG. 7, message 701 bears CRL 620. CRL 620 includes a new list entry, thus a public key is revoked and participants in the PKI infrastructure to which root CA 140 belongs will be notified of the revocation by means of CRL 620. The publication time value 516 for CRL 630 is $tp_2=t_0$ of FIG. 7. CRL 620 is subsequently conveyed in messages 702 and 703 to the certificate function 112 of the device 110. The certificate function 112 performs action 10. Action 10 includes reading the expiry time 518 value in the expiry field 517 of the CRL 620 and performing filtering similar to FIG. 3. The filtering action of the certificate function 112, in some embodiments, makes use of the new entry field 519 and/or the last sequence field 521.

In the example of FIG. 7, the certificate function 112 reads the new entry value 520 indicating "New" from the new entry field 519 of the CRL 620. The list that is new is List 2 read from the list field 523 of CRL 620. Certificate function 112 retains state information pertaining to the root CA 140 indicating that: i) the last sequence number of a CRL from root CA 140 is 2, and ii) List 2 was new in a CRL from the root CA 140 with current sequence value 514 of 2. FIG. 6C illustrates field 513 conveying the current sequence value 2, field 519 conveying the value indicating "New," and field 523 conveying list 2. FIG. 7 represents this state information at time $t_1$ as CRL sequence state 1.

At event 20, another certificate is revoked and CRL 630 of FIG. 6D is published by the root CA 140 at the time $t_2$. CRL 630 is conveyed by messages 705, 706, and 707 to the certificate function 112 of the device 110. The certificate function 112 performs action 20. Certificate function 112 is in possession of CRL sequence state 1 at the time the CRL 630 arrives. Certificate function 112 notes that current sequence values 514 have increased by one, as expected (from 2 to 3). The last sequence value 522 of CRL 630 is 2 as expected. A new list has arrived, List 3. Certificate function 112 updates its state information for root CA 140 at time $t_3$; the collection of information is denoted CRL sequence state 2 in FIG. 7.

In this example, a malicious actor intervenes at about the time $t_4$. A CA may send one or more CRLs and a malicious actor performs a man-in-the-middle (MIM) attack. CRLs sent by a CA during an MIM attack do not reach the intended recipient. Event 30 and message 708 are representative of publication of CRLs 640 and 650. The dashed line ellipse labelled MIM 30 indicates that at some network point between root CA 140 and Device 110 over a span of time including the time $t_4$, the message 708 and possibly other messages (indicated by " . . . " at time $t_4$) are lost and not delivered to the device 110.

Subsequently, root CA 140, unaware of the MIM 30, publishes CRL 660 (see FIG. 6G) at a time $t_5$ (by which time MIM 30 has ceased) due to an event 60. CRL 660 is conveyed to the certificate function 112 of the device 110 by the messages 709, 710 and 711. The certificate function 112 is in possession of CRL sequence state 2 at the time CRL 660 arrives. The certificate function 112 performs action 40, including filtering the received CRL, and determines, as part of the filtering, whether delivery of the CRL is estimated to be unreliable.

Current sequence field 513 of CRL 660 holds an unexpected value with respect to CRL sequence state 2. The last current sequence value 514 observed by the certificate function is 3, read from the CRL 630. The last time a new list was received, the current sequence value 514 was the value 3. However, CRL 660 indicates a current sequence value 514 of 6 (a jump of 6−3=3, not the expected increment of 1), a last sequence value 522 of 5 and that the list in field 523 of CRL 660 is not new. Although the CRL 660 arriving in the message 711 at the device 110 is in fact bona fide, the certificate function 112 detects a discontinuity in the fields of the CRL 660 from the CRL sequence state 2. For example, certificate function 112 has not observed a CRL with a current sequence value 5 reporting a new list. The certificate function 112 determines that an unreliable event may have occurred and issues one or more warnings. In the example of FIG. 7, a warning 712 is sent at time $t_6$ to an end user via the user interface 119. A warning is also sent at about the time $t_6$ by message 713 to the root CA 140.

Responsive to the message 712, the end user reads the warning and enters a response (action 41) via the user interface 119. The certificate function 112 reads the response 714 and performs action 43, which includes, in some embodiments, forwarding (not shown) the CRL 660 to the eUICC 100.

CRL Sequence Method

In some embodiments, a device performs a method of detecting an interruption in a CRL sequence. The method includes receiving a first CRL at a first time, storing information from a data part of the first CRL in a CRL sequence state, and receiving a second CRL at a second time. The method also includes comparing information in a data part of the second CRL with the CRL sequence state to determine whether one or more CRLs were not received at the device prior to the second time, and determining an unreliability indication based on the comparing, wherein a positive unreliability indication corresponds to an estimation that an interruption in the observed sequence of CRLs has occurred. When the unreliability indication is positive, the device provides a warning to a user or to an infrastructure entity. When the unreliability indication is negative, the device updates the CRL sequence state based on the second CRL, and forwards the second CRL to an eUICC included in the device.

Pinning Table Check

Figure 8:
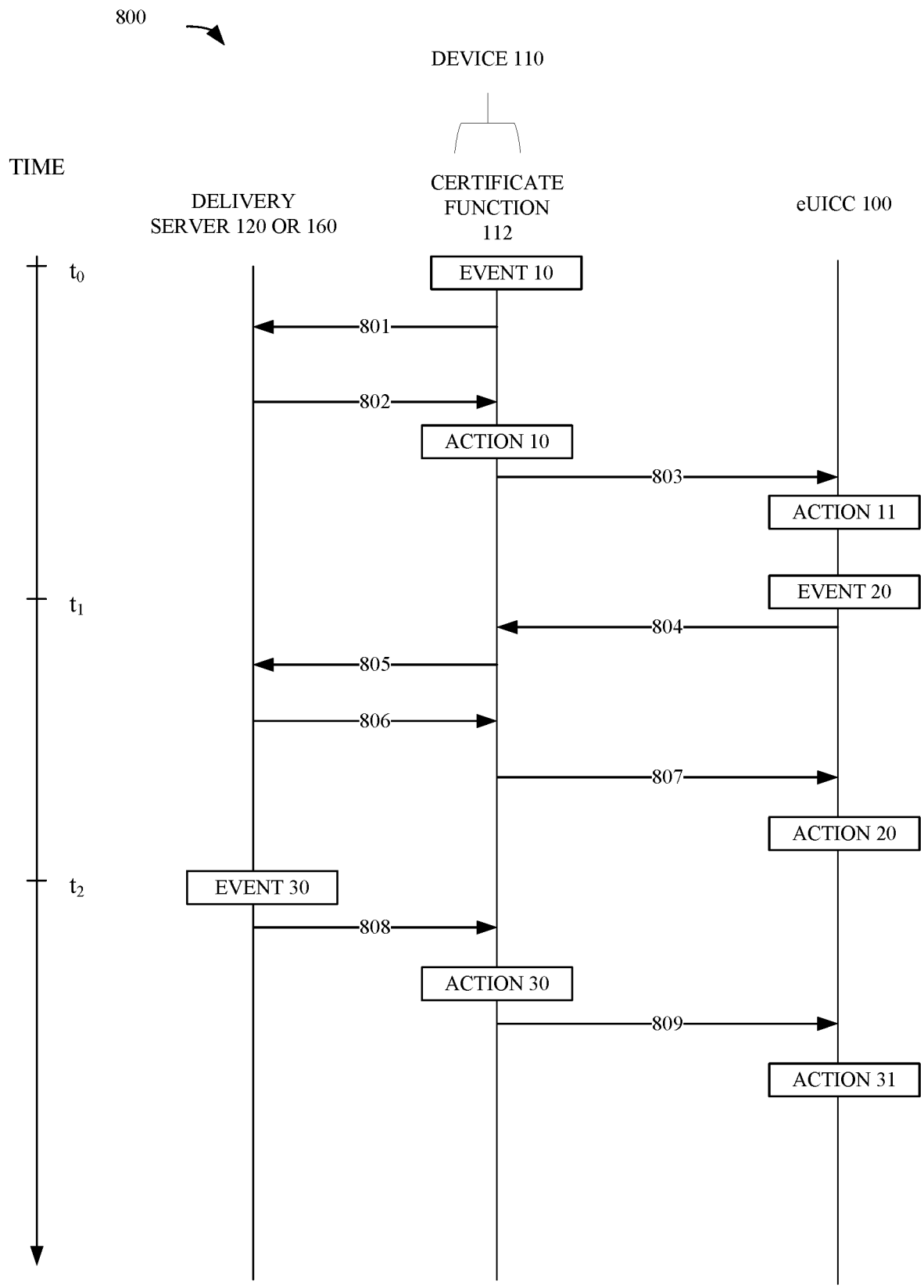
FIG. 8 illustrates exemplary message flows pertaining to maintaining pinning tables at a device and at an eUICC, according to some embodiments.

FIG. 8 illustrates a diagram 800 of the device 110 assisting the eUICC 100 by performing a certificate pinning check. At a time $t_0$, the certificate function 112 determines that, for example, a certificate or key rotation is expected or has occurred for the CA 130 or the eSIM server 180. The certificate function 112 sends a message 801 to the delivery server 120 or 160 (or to the CA 130, message not shown), requesting an updated certificate. The certificate function 112 receives a new certificate at 802 and performs Action 10. Action 10, in some embodiments, includes computing a hash value based on the new certificate and sending the computed hash value and/or the new certificate to the eUICC 100 in message 803. The computed hash value, in some embodiments, is stored in the pinning table 118 in a row or data portion associated with the CA 130 or with the eSIM server 180. The new hash value does not immediately overwrite an old hash value. In some embodiments, there is a transition period or overlapping time period during which both the old and new public key-private key pairs of the CA 130 or of the eSIM server 180, and thus both the old and new certificates, of the CA 130 or of the eSIM server 180 are valid. At Action 11, the eUICC 100, in some embodiments, performs an authentication check on the signature part 504 of a certificate received in the message 803. The authentication check can be based on the public key of the root CA 140, which has not changed at the time the new certificate for the CA 130 or for the eSIM server 180 are published. The eUICC 100 can, based on successful authentication, then update the pinning table 108 with respect to the row or data portion associated with the CA 130 or with the eSIM server 180.

The eUICC 100, in some embodiments, requests a certificate for the CA 130 or for the eSIM server 180, for example, in order to refresh or keep current the pinning table 108 (Event 20 at a time $t_1$ in FIG. 8). This request is sent to the delivery server 120 or 160, possibly through the certificate function 112 as message 804 followed by message 805. The delivery server 120 or 160 responds, in the message 806, with a copy of the current certificate. The message 806 is forwarded to the eUICC 100 in message 807 and the eUICC 100 updates the pinning table 108 at Action 20, similarly to the steps taken in action 11. In some embodiments, the message 807 includes a hash computed by the certificate function 112 over the certificate received by the device 110/certificate function 112 in the message 806.

At a time $t_2$, as an example in some embodiments, the delivery server 120 or 160 decides (Event 30) to push a certificate for the CA 130 (or a root CA, such as root CA 140) or for the eSIM server 180 to the eUICC 100. The certificate, for example for eSIM server 180, arrives in message 808. The certificate function, in some embodiments, performs a pinning check (denoted Action 30 in FIG. 8) on the certificate received in the message 808. If the hash computed on the certificate of the message 808 does not match a hash value found in the pinning table in a row or data portion associated with the eSIM server 180, then the certificate function issues a warning (not shown) to the root CA 140 or to an end user. At 809, in this example, the certificate originally sent by the delivery server 120 or 160 based on the event 30 is sent to the eUICC in message 809. The eUICC 100, in some embodiments, then performs a pinning check (Action 31) by computing a hash value on the arriving certificate and comparing it with entries in the eSIM server 180 row or data portion of the pinning table 108.

Some Reliability-Checking Methods

In one embodiment, a device comprising an eUICC receives a first CRL from a CA via a server, receives a second CRL from the CA via the server, compares the second CRL to the first CRL, determines whether delivery from the server is reliable based on the comparison, and produces a reliability indication based on the determining. When i) the reliability indication is positive and ii) the second CRL comprises revocation information absent in the first CRL, the device forwards the second CRL to the eUICC.

In another embodiment, an eUICC receives a first CRL from a CA via a device that includes the eUICC. Then, the eUICC receives a second CRL from the CA via the device. The eUICC compares the second CRL to the first CRL and determines whether overall CRL delivery is reliable based on the comparing. The eUICC then produces a reliability indication based on the determining. When the reliability indication is positive (indicating satisfactory reliability), the eUICC removes a first public key found in the second CRL from a list of trusted public keys in the eUICC. When the reliability indication is not positive (indicating something is amiss), the eUICC sends, via the device, an error report to a CA, for example a root CA or a CI.

Some Pinning Methods

In one pinning embodiment, a device sends a request for a public-key certificate to a server and the device receives the requested certificate from the server. The device then computes a hash value based on the public-key certificate and sends the hash value to the eUICC. In some embodiments, the hash value is based on a data part of the public-key certificate. In some embodiments, the hash value is based on a data structure of the public-key certificate, wherein the data structure comprises a data part and a signature part.

In another pinning embodiment, an eUICC requests a public-key certificate from a server via a device. The eUICC receives the public-key certificate from the server via the device and stores the public-key certificate in the eUICC. The eUICC then updates a trusted list of servers with a row corresponding to the public-key certificate, wherein the row comprises a first hash value based on the public-key certificate. Then the eUICC receives a second hash value from the device and updates the row with the second hash value. In some embodiments, the eUICC maintains the first hash value and the second hash value in the row for a transition period, wherein the transition period corresponds to a key rotation event.

Some eUICC Details

Figure 9:
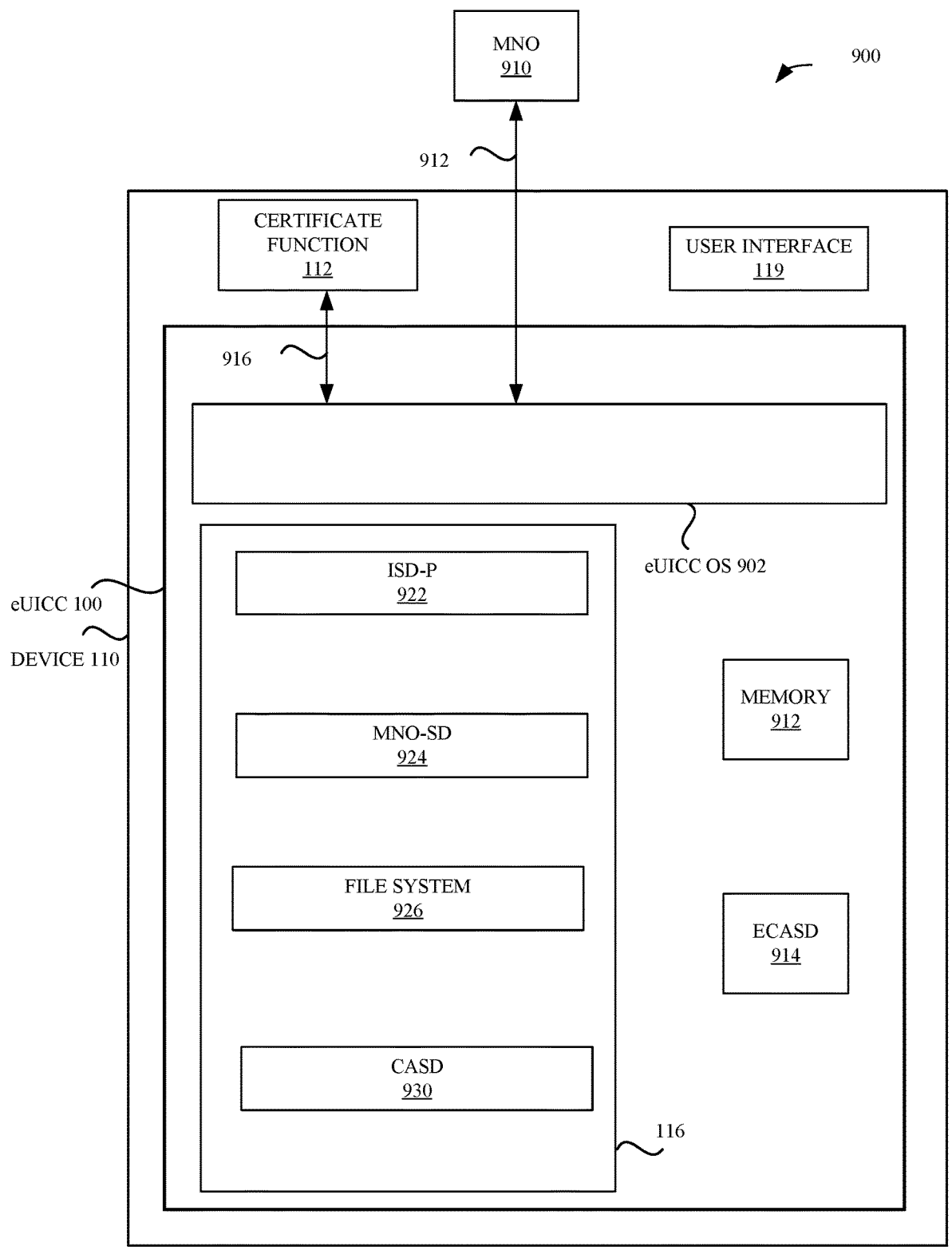
FIG. 9 illustrates exemplary internal features of an eUICC and a device, according to some embodiments.

FIG. 9 illustrates some details of the eUICC 100 in a system 900. The eUICC OS 902 may be, for example, in communication with a mobile network operator (MNO) 910. Device 110 includes, for example, the certificate function 112 in communication with the eUICC OS 902 over a trusted interface 916. Non-volatile memory is associated with or available for use by the certificate function 112 in order to store CRL sequence state as described with respect to FIG. 7 and to store certificates 114, 115, CRL 115, trusted list 117 and pinning table 118.

The eUICC 100 can include a profile 116. The profile 116 can include an ISD-P 922. An ISD-P (issuer security domain-profile) can host a unique profile. The ISD-P is a secure container or security domain for the hosting of the profile. The ISD-P is used for profile download and installation based on a received bound profile package. The profile 116 can also include an MNO-SD 924. An MNO-SD is the representative on the eUICC 100 of an MNO providing services to an end user of the device 110 (for example, MNO 910). The profile 116 can also include a file system 926 and a CASD or key store 930. Also illustrated are memory 912 and ECASD 914.

Example Logic for a Device and an eUICC Checking Public Key Information

Figure 10:
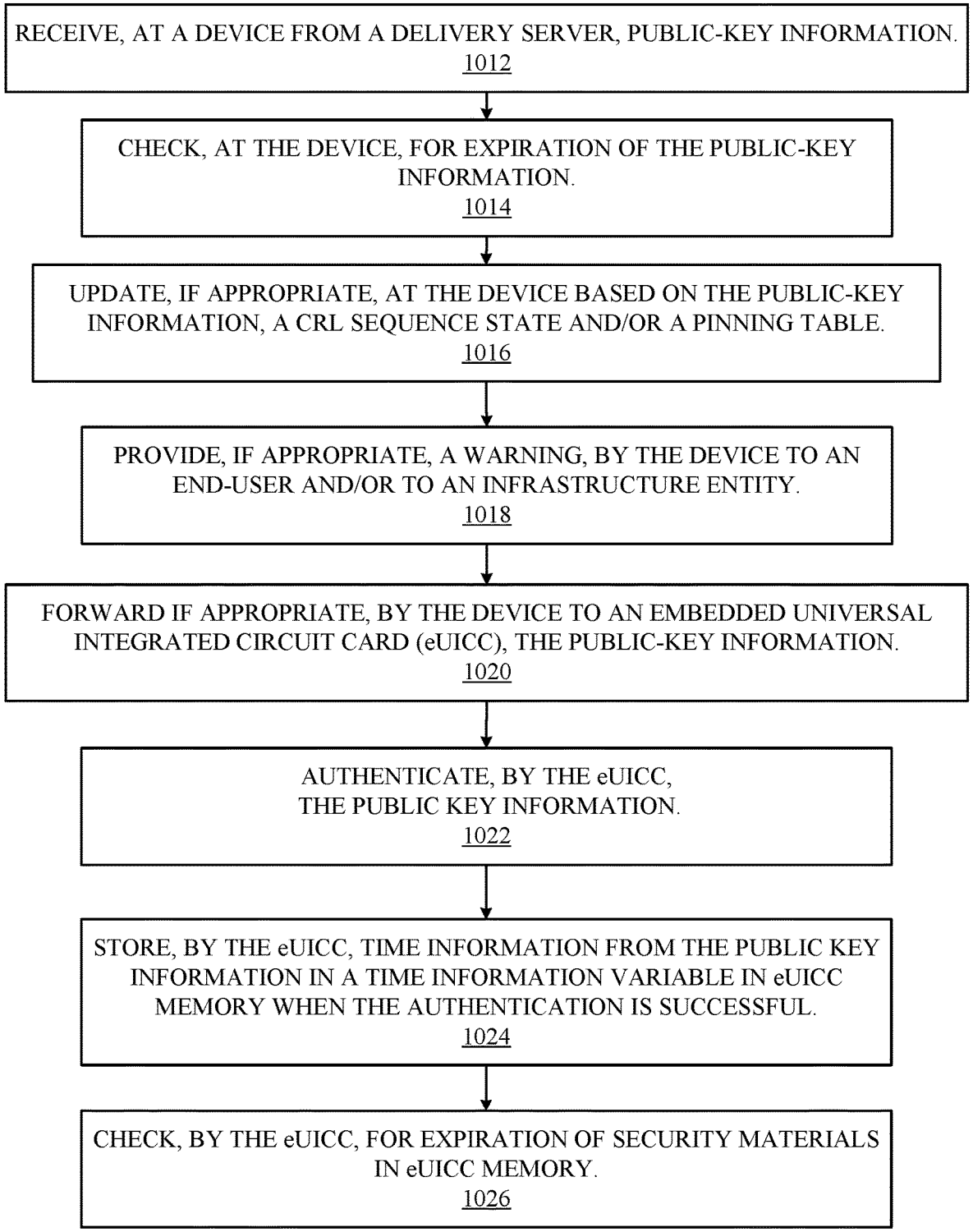
FIG. 10 illustrates exemplary logic for verification of public key information by a device and by an eUICC, including maintenance of time information in the eUICC, according to some embodiments.

FIG. 10 illustrates a flowchart 1000 of example logic illustrating steps taken to check public key information such as a certificate or CRL received from a delivery server. The certificate, in some embodiments, includes an OCSP response. In other words, the certificate in some embodiments is a certificate with an addendum or attachment which is an OCSP response (an "OCSP stapled" certificate). A certificate, CRL or OCSP stapled certificate can be referred to herein as security material.

At 1012 of FIG. 10, a device receives public key information from a delivery server. At 1014, the device checks for expiration of the public key information. At 1016, the device updates CRL sequence state as described with respect to FIG. 7 and/or a pinning table as described, for example, with respect to FIGS. 1A and 8. At 1018, the device provides a warning as described for example, with respect to FIG. 3, 4, 7, or 8. At 1020 the device forwards, if appropriate, the public key information to an eUICC, as described, for example, with respect to FIG. 3, 4, 7, or 8. At 1022, the eUICC authenticates the signature part of the public key information as described with respect to FIGS. 4, 5B, 7, and 8. The eUICC, in some embodiments, maintains a notion of time. At 1024, the eUICC, in some embodiments, stores time information parsed from the public key information in eUICC memory when the authentication is successful. At 1026, the eUICC checks for expiration of security materials such as certificate 104, certificate 105, and/or CRL 106 of FIG. 1A stored, for example, in the ECASD 914 of FIG. 9. If materials have expired, the eUICC in some embodiments, requests new materials from a root CA, CA, or from the delivery server. The time information, in some embodiments, is an epoch value, a counter value, and/or a timestamp.

Device and eUICC Time Checking

Maintenance of a time information variable or parameter in an eUICC allows the eUICC to perform a certificate expiration and/or publication date and/or time check. The device can also perform this check. For example, if an expiration time value in a certificate is earlier than the time information value stored in the time information variable, in some embodiments, the eUICC or device may i) discard the certificate, ii) request a new certificate, iii) use the OCSP protocol, iv) use the OCSP stapling protocol, and/or v) rely on an epoch value as part of authenticating communications from the certificate holder.

The device or eUICC, in some embodiments, may compare an incoming certificate or related message (e.g. OCSP stapling) time with the time information stored in the device or eUICC to ensure validity. The time checking can be done in several different ways. The purpose of the time checking is to check that the examined item (certificate, CRL, OCSP stapled message, or other secure message) is up-to-date, current, fresh, and/or not expired. The essential aspect of the time check is to measure a difference in time between the time information in the eUICC and a time value of some kind associated with the examined item. A thresholding measurement or acceptable difference may be indicated by use of a security window. A certificate, CRL, OCSP stapled message, or other secure message may referred to herein as secure material.

The device or eUICC may use the stored time information, in some embodiments, together with revocation schemes such as CRL and OCSP. For example, upon receiving a CRL, the device or eUICC may i) immediately place on an untrusted list identities of servers whose certificates are identified in the CRL, and ii) continue to rely on the certificates of servers not identified in the CRL.

In some embodiments, the eUICC receives an update to an epoch value from a root CA, for example. The eUICC then, in some embodiments, does not communicate with the servers identified in the CRL until new certificates for those servers arrive at the device or eUICC with the updated epoch value. This allows smooth transition between new and old epoch update and yet allow manageable size of CRL stored on the client side.

In some embodiments, a device or an eUICC obtains an OCSP stapling message including a time at which the CA timestamped and signed the OCSP response. The device or the eUICC may then compare the time information value stored in the device or in the eUICC against the signed timestamp of the OCSP stapling message (OCSP stapling timestamp). If the difference of the time information value and the OCSP stapling timestamp is within an acceptable window, the, in some embodiments, will consider the associated certificate to be trustworthy (i.e. not stale, not compromised, not revoked).

Also, the eUICC may check the epoch in addition to checking the OCSP stapling timestamp. Depending on the security required, the eUICC may trust the certificate associated with the sender if either the difference of the eUICC time information value and the OCSP stapling timestamp is within a security window or if the epoch value associated with the received OCSP stapling message matches a current epoch value maintained by the eUICC. In some embodiments, the eUICC may require that all indications concerning the OCSP stapling message are not stale. That is, the eUICC may only process the message (i.e., trust the sender) if the difference of the eUICC time information value and the OCSP stapling timestamp is within the security window and the epoch value associated with the received message matches a current epoch value maintained by the eUICC.

Periodically, or after updating the timestamp information, the eUICC may perform a cleanup operation on the certificates and/or CRL list store in the eUICC. For example, after updating the time information on the eUICC, the eUICC operating system (OS) may identify information that is stale based on being too old compared to the time information value. For example, any certificate with an expiration time before an actual time stored as time information can be discarded and/or the associated server moved to an untrusted list. Any certificates which are vouched-for based on OCSP stapling can be discarded if a difference between the eUICC time information value and the timestamp included in the OCSP stapling message falls outside of a security window. The window may, for example, correspond to one day, one week, or one month.

In this way, trusted and stored public keys and certificates that have expired can be deleted from the memory or key store of the eUICC. Also, when a CRL list or entries in the CRL are no longer valid, the CRL list can be corrected by recognizing servers which have obtained new certificates from, for example, a root CA. In addition, an untrusted list can be updated with servers whose certificates have expired or who fail the OCSP or OCSP stapling protocol. Servers which are associated with certificates having time information or OCSP information or OCSP stapling information which falls inside of a security window when compared with the eUICC time information may be listed on a trusted list of servers.

Representative Exemplary Apparatus

Figure 11:
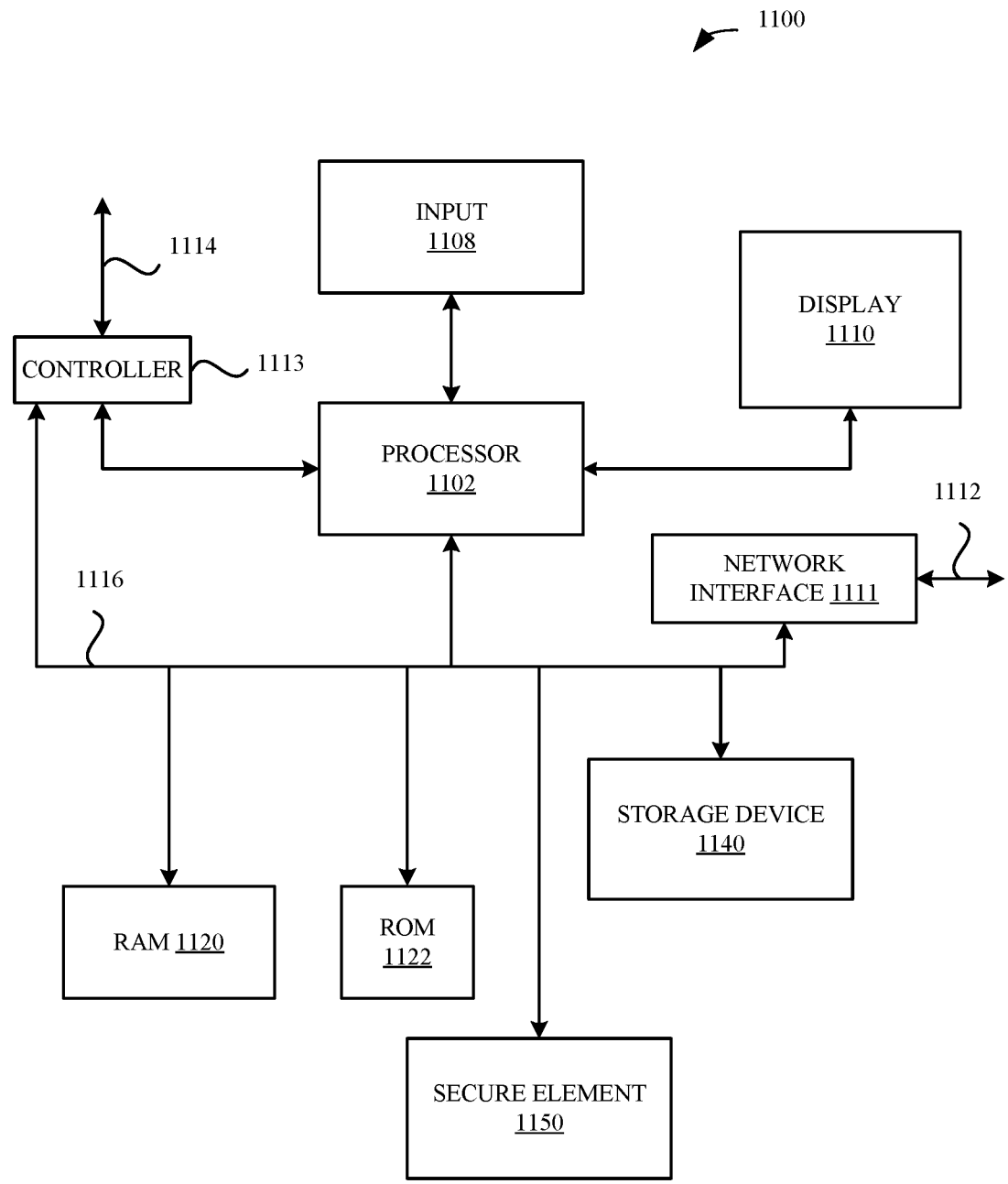
FIG. 11 illustrates an exemplary apparatus for implementation of the embodiments disclosed herein.

FIG. 11 illustrates in block diagram format an exemplary computing device 1100 that can be used to implement the various components and techniques described herein, according to some embodiments. In particular, the detailed view of the exemplary computing device 1100 illustrates various components that can be included in the device 110, the eUICC 100 and the servers, CAs, and root CA illustrated in one or more of FIGS. 1A, 1B, 2, and 9. As shown in FIG. 11, the computing device 1100 can include a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 (screen display) that can be controlled by the processor 1102 to display information to the user (for example, information relating to incoming, outgoing, or active communication session). A data bus 1116 can facilitate data transfer between at least a storage device 1140, the processor 1102, and a controller 1113. The controller 1113 can be used to interface with and control different equipment through an equipment control bus 1114. The computing device 1100 can also include a network/bus interface 1111 that couples to a data link 1112. In the case of a wireless connection, the network/bus interface 1111 can include wireless circuitry, such as a wireless transceiver and/or baseband processor.

The computing device 1100 also includes a storage device 1140, which can comprise a single storage or a plurality of storages (e.g., hard drives), and includes a storage management module that manages one or more partitions within the storage device 1140. In some embodiments, storage device 1140 can include flash memory, semiconductor (solid state) memory or the like. The computing device 1100 can also include a Random Access Memory ("RAM") 1120 and a Read-Only Memory ("ROM") 1122. The ROM 1122 can store programs, utilities or processes to be executed in a non-volatile manner. The RAM 1120 can provide volatile data storage, and stores instructions related to the operation of the computing device 1100. The computing device 1100 also can include a secure element 1150.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station", "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method by a device comprising an embedded universal integrated circuit card (eUICC) and a user interface, the method comprising:
   receiving, from a first entity, a first message comprising a certificate revocation list (CRL) including:
      i) an indication if the CRL includes a new list of revoked certificates;
      ii) a sequence number or timestamp applicable only to the CRL; and
      iii) a value of a sequence number or timestamp of a most recent, previously transmitted CRL that included a corresponding new list of revoked certificates;
   filtering the first message based on a configuration of the device to produce a filtering decision value based on:
      i) whether the CRL includes the new list of revoked certificates; and
      ii) when the CRL includes the new list of revoked certificates, a comparison of the value of the sequence number or timestamp of a most recent, previously received CRL that included a new list to the value of the sequence number or timestamp of the most recent, previously transmitted CRL that included the corresponding new list of revoked certificates as indicated in the currently received CRL;
   when the filtering decision value is a negative value indicating that a warning need not be issued:
      forwarding the first message to the eUICC; and
   when the filtering decision value is a positive value indicating that a warning should be issued:
      providing a user warning on the user interface, and
      providing an infrastructure warning to a certificate authority (CA), wherein the infrastructure warning comprises i) an identity of a signer of the CRL of the first message and ii) an identifier of the first message.

2. The method of claim 1, further comprising, when the filtering decision value is positive:
   forwarding the first message to the eUICC when an expiration time of a content of the first message is later than a second expiration time of a content of a last-forwarded message provided to the eUICC.

3. The method of claim 1, wherein the method further comprises, when the filtering decision value is a positive value:
   providing a message on the user interface, wherein the message indicates a second entity that signed the first message;
   receiving a response on the user interface, wherein the response indicates whether a user trusts or does not trust the second entity; and
   when the response indicates that the user trusts the second entity, forwarding the first message to the eUICC.

4. The method of claim 1, wherein the first message comprises a data part and a signature part, and wherein the method further comprises:
   determining, subsequent to receiving the first message, a first hash value based on the first message;
   reading, from a pinning table in the device, a second hash value; and
   producing the filtering decision value further based on comparing the first hash value with the second hash value, wherein the filtering decision value is the positive value when the first hash value does not match the second hash value.

5. The method of claim 1, wherein the first message comprises a data part and a signature part, and wherein the method further comprises:
   determining a current time value;
   determining an expiration time value;
   determining a first hash value based on the first message;
   reading, from a pinning table in the device, a second hash value, and producing the filtering decision value further based on: i) comparing the expiration time value with the current time value, and ii) comparing the first hash value with the second hash value to produce a matching result, wherein the filtering decision value is the negative value when i) the expiration time value is later than the current time value, and ii) the matching result indicates that the first hash value matches the second hash value.

6. The method of claim 1, wherein the CRL is signed by the CA.

7. The method of claim 6, further comprising:
   searching an untrusted list to determine a presence of an identity of the CA on the untrusted list; and
   when the identity of the CA is not present on the untrusted list, forwarding the first message to the eUICC.

8. The method of claim 1, wherein:
   the infrastructure warning further comprises an identity of the first entity; and
   the first entity comprises a delivery server.

9. The method of claim 8, wherein the CA comprises a root CA or an intermediate CA.

10. The method of claim 1, wherein the filtering decision value is determined to be a positive value when the comparison of the sequence number or timestamp values indicates an interruption in reception by the device of a sequence of received CRLs that include new lists of revoked certificates.

11. A device comprising an embedded universal integrated circuit card (eUICC), a user interface, one or more processors, and a memory storing instructions that, when executed by the one or more processors, cause the device to perform operations comprising:
   receiving, from a first entity, a first message comprising a certificate revocation list (CRL) including:
      i) an indication if the CRL includes a new list of revoked certificates;
      ii) a sequence number or timestamp applicable only to the CRL; and
      iii) a value of a sequence number or timestamp of a most recent, previously transmitted CRL that included a corresponding new list of revoked certificates;
   filtering the first message based on a configuration of the device to produce a filtering decision value based on:
      i) whether the CRL includes the new list of revoked certificates; and
      ii) when the CRL includes the new list of revoked certificates, a comparison of the value of the sequence number or timestamp of a most recent, previously received CRL that included a new list to the value of the sequence number or timestamp of the most recent, previously transmitted CRL that included the corresponding new list of revoked certificates as indicated in the currently received CRL;
   when the filtering decision value is a negative value indicating that a warning need not be issued:

forwarding the first message to the eUICC; and
when the filtering decision value is a positive value indicating that a warning should be issued:
  providing a user warning on the user interface, and
  providing an infrastructure warning to a certificate authority (CA) wherein the infrastructure warning comprises i) an identity of a signer of the CRL of the first message and ii) an identifier of the first message.

12. The device of claim 11, wherein the operations further comprise, when the filtering decision value is positive:
  forwarding the first message to the eUICC when an expiration time of a content of the first message is later than a second expiration time of a content of a last-forwarded message provided to the eUICC.

13. The device of claim 11, wherein the operations further comprise, when the filtering decision value is a positive value:
  providing a message on the user interface, wherein the message indicates a second entity that signed the first message;
  receiving a response on the user interface, wherein the response indicates whether a user trusts or does not trust the second entity; and
  when the response indicates that the user trusts the second entity, forwarding the first message to the eUICC.

14. The device of claim 11, wherein the first message comprises a data part and a signature part, and wherein the operations further comprise:
  determining, subsequent to receiving the first message, a first hash value based on the first message;
  reading, from a pinning table in the device, a second hash value; and
  producing the filtering decision value further based on comparing the first hash value with the second hash value, wherein the filtering decision value is the positive value when the first hash value does not match the second hash value.

15. The device of claim 11, wherein the first message comprises a data part and a signature part, and wherein the operations further comprise:
  determining a current time value;
  determining an expiration time value;
  determining a first hash value based on the first message;
  reading, from a pinning table in the device, a second hash value;
  producing the filtering decision value further based on: i) comparing the expiration time value with the current time value, and ii) comparing the first hash value with the second hash value to produce a matching result, wherein the filtering decision value is the negative value when i) the expiration time value is later than the current time value, and ii) the matching result indicates that the first hash value matches the second hash value.

16. The device of claim 11, wherein the CRL is signed by the CA.

17. The device of claim 16, wherein the operations further comprise:
  searching an untrusted list to determine a presence of an identity of the CA on the untrusted list; and
  when the identity of the CA is not present on the untrusted list, forwarding the first message to the eUICC.

18. The device of claim 11, wherein:
  the infrastructure warning further comprises an identity of the first entity; and
  the first entity comprises a delivery server.

19. The device of claim 18, wherein the CA comprises a root CA or an intermediate CA.

20. A non-transitory computer readable medium including instructions that, when executed by one or more processors in a device, cause the device to perform operations comprising:
  receiving, from a first entity, a first message comprising a certificate revocation list (CRL) including:
    i) an indication if the CRL includes a new list of revoked certificates;
    ii) a sequence number or timestamp applicable only to the CRL; and
    iii) a value of a sequence number or timestamp of a most recent, previously transmitted CRL that included a corresponding new list of revoked certificates;
  filtering the first message based on a configuration of the device to produce a filtering decision value based on:
    i) whether the CRL includes the new list of revoked certificates; and
    ii) when the CRL includes the new list of revoked certificates, a comparison of the value of the sequence number or timestamp of a most recent, previously received CRL that included a new list to the value of the sequence number or timestamp of the most recent, previously transmitted CRL that included the corresponding new list of revoked certificates as indicated in the currently received CRL;
  when the filtering decision value is a negative value indicating that a warning need not be issued:
    forwarding the first message to an embedded universal integrated circuit card (eUICC) of the device; and
  when the filtering decision value is a positive value indicating that a warning should be issued:
    providing a user warning on a user interface of the device, and
    providing an infrastructure warning to a certificate authority (CA), wherein the infrastructure warning comprises i) an identity of a signer of the CRL of the first message and ii) an identifier of the first message.

* * * * *